US012776940B2

United States Patent

(12) United States Patent
Hamidi-Sepehr et al.

(10) Patent No.: US 12,776,940 B2
(45) Date of Patent: Oct. 27, 2026

(54) EFFICIENT HANDLING OF USER EQUIPMENT (UE) PROCESSING CAPABILITY AND TIME DIMENSIONING

(71) Applicant: Intel Corporation, Santa Clara, CA (US)

(72) Inventors: Fatemeh Hamidi-Sepehr, San Jose, CA (US); Qian Li, Portland, OR (US); Yujian Zhang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 18/557,267

(22) PCT Filed: Aug. 3, 2022

(86) PCT No.: PCT/US2022/039308
§ 371 (c)(1),
(2) Date: Oct. 25, 2023

(87) PCT Pub. No.: WO2023/014813
PCT Pub. Date: Feb. 9, 2023

(65) Prior Publication Data
US 2024/0259246 A1 Aug. 1, 2024

Related U.S. Application Data

(60) Provisional application No. 63/229,410, filed on Aug. 4, 2021.

(51) Int. Cl.
*H04L 27/26* (2006.01)
*H04L 1/1829* (2023.01)

(52) U.S. Cl.
CPC .......... *H04L 27/265* (2013.01); *H04L 1/1854* (2013.01)

(58) Field of Classification Search
CPC ............................ H04L 27/265; H04L 1/1854
See application file for complete search history.

(56) References Cited

U.S. PATENT DOCUMENTS

2005/0262510 A1 11/2005 Parameswaran et al.
2008/0225965 A1 9/2008 Pi et al.
(Continued)

FOREIGN PATENT DOCUMENTS

EP 3547576 A 10/2019
WO 2018128873 A1 7/2018
WO 2018143891 A1 8/2018

OTHER PUBLICATIONS

3GPP, "Technical Specification Group Radio Access Network; NR; Multiplexing and channel coding (Release 16)," 3GPP TS 38.212 V16.6.0 (Jun. 2021), 5G, 153 pages.
(Continued)

*Primary Examiner* — James P Duffy
(74) *Attorney, Agent, or Firm* — Gray Ice Higdon, PLLC

(57) ABSTRACT

Various embodiments herein are directed to efficient handling of user equipment (UE) processing capability and time dimensioning. For example, some embodiments are directed to transceiver processing task parallelization. An apparatus comprises memory to store a plurality of code blocks (CBs) within one orthogonal frequency division multiplexing (OFDM) symbol that are mapped into frequency resources of a plurality of fast Fourier transform (FFT) operations, and processing circuitry to retrieve the plurality of CBs from the memory, and process FFT operations of the plurality of CBs in parallel independently of each other.

20 Claims, 10 Drawing Sheets

(56) References Cited

U.S. PATENT DOCUMENTS

| | | | | |
|---|---|---|---|---|
| 2014/0098691 | A1 | 4/2014 | Kazmi et al. | |
| 2019/0132089 | A1 | 5/2019 | Hwang et al. | |
| 2020/0092047 | A1 | 3/2020 | Yeo et al. | |
| 2021/0258829 | A1 * | 8/2021 | Lin .................. | H04W 72/0466 |

OTHER PUBLICATIONS

3GPP, “Technical Specification Group Radio Access Network; NR; Physical layer procedures for data (Release 16),” 3GPP TS 38.214 V16.6.0 (Jun. 2021), 5G, 172 pages.

Qualcomm, “E-mail discussions on 2-stage DCI for NR,” TSG-RAN WG1 #88, R1-1702629, Agenda Item: 8.1.3.1.5, Feb. 13-17, 2017, Athens, Greece, 12 pages.

International Patent Office—International Search Report and Written Opinion mailed Nov. 15, 2022 from International Patent Application No. PCT/US2022/039308, 14 pages.

3GPP, “Technical Specification Group Radio Access Network; NR; User Equipment (UE) radio access capabilities (Release 16),” 3GPP TS 38.306 V16.5.0 (Jun. 2021), 5G, 153 pages.

Supplementary European Search Report mailed Aug. 11, 2025, from EP Application No. 22853866.6, filed Aug. 3, 2022, 12 pages.

* cited by examiner

EFFICIENT HANDLING OF USER EQUIPMENT (UE) PROCESSING CAPABILITY AND TIME DIMENSIONING

CROSS REFERENCE TO RELATED APPLICATION

The present application is a national phase entry under 35 U.S.C. § 371 of International Application No. PCT/US2022/039308, filed Aug. 3, 2022, entitled "EFFICIENT HANDLING OF USER EQUIPMENT (UE) PROCESSING CAPABILITY AND TIME DIMENSIONING," which claims priority to U.S. Provisional Patent Application No. 63/229,410, which was filed Aug. 4, 2021, the entire disclosures of which are hereby incorporated by reference.

FIELD

Various embodiments generally may relate to the field of wireless communications. For example, some embodiments may relate to efficient handling of user equipment (UE) processing capability and time dimensioning. For example, some embodiments are directed to transceiver processing task parallelization.

BACKGROUND

Sixth-generation (6G) wireless systems are expected to provide better user experience and performance compared to the prior wireless technologies such as long-term evolution (LTE) and fifth-generation (5G). Some of the target key performance indicators (KPI) to aim for are supporting wider bandwidths compared to 5G (e.g. at least 2 GHz or larger), supporting higher peak data rates beyond 100 Gbps (10× or higher peak data rate as compared to 5G), and providing lower physical layer latency as low as 0.1 ms (compared to 0.5-1 ms 5GNR user plane (UP) latency under certain configurations). In such cases, the UP latency is the overall required time to successfully deliver an application layer packet from layer three to layer two ingress at the transmitter side to the layer two to layer three egress at the receiver side. 6G is also expected to enable better support of vertical industries, including support for private networks. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
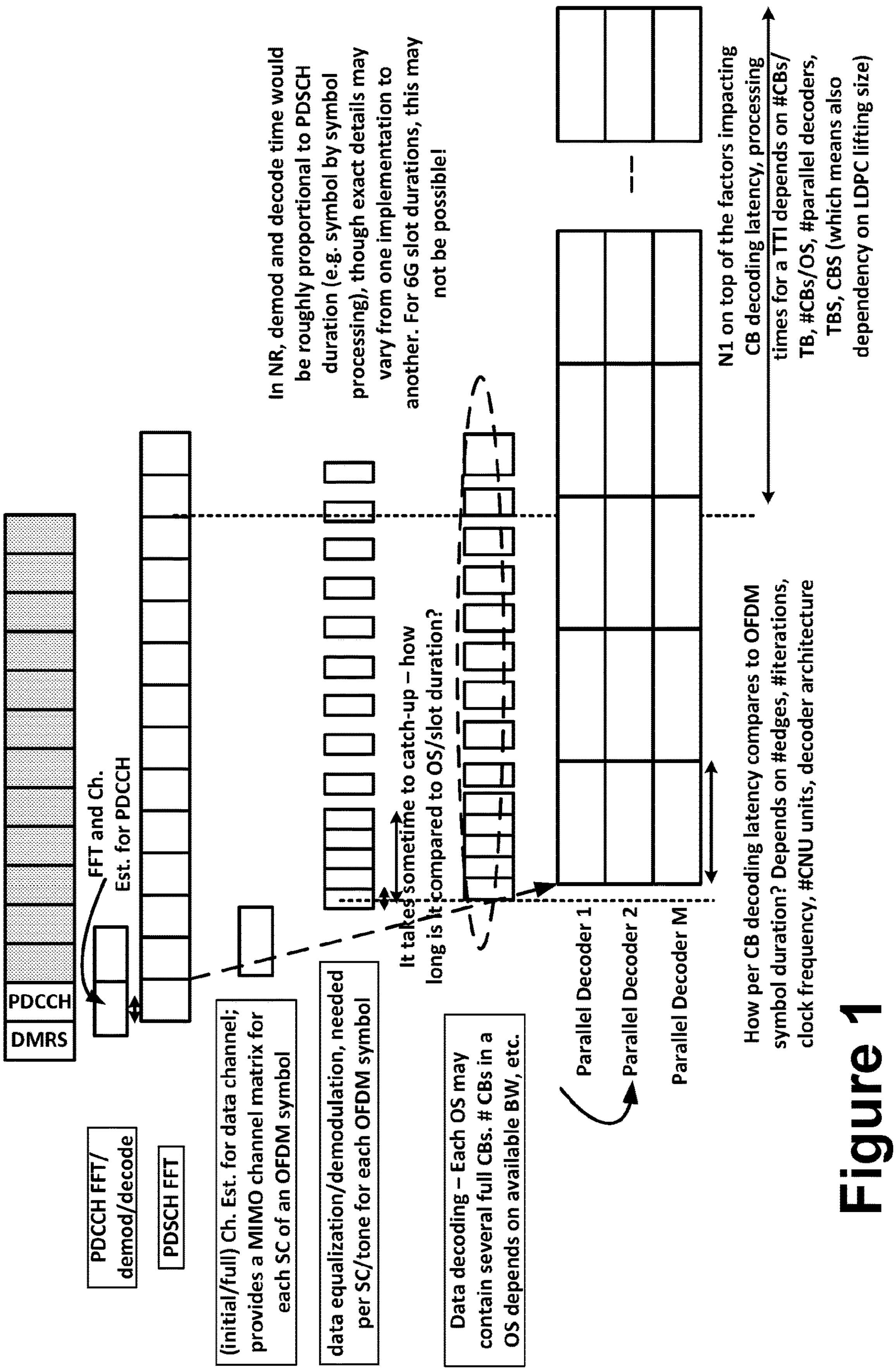
FIG. 1 illustrates an example of pipelined processing timeline (CP-OFDM) in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

6G Requirements for Data-Rate and Latency

As introduced above, 6G wireless systems are expected to provide better user experience and performance compared to the prior wireless technologies such as LTE and 5G. 6G is also expected to enable better support of vertical industries, including support for private networks.

For example, based on some estimates, achieving a 200 Gbps data-rate a bandwidth (BW) of roughly 20-50 GHz over total number of supported carriers may be sufficient. As such, the bandwidth of a single carrier may be roughly 2-5 GHz, depending on the numerology, etc.

For next generation technology design, and specifically, latency-critical traffic, the goal is to significantly reduce the latency compared to what is achievable in NR (e.g., about 10× reduction).

For example, as 6G is expected to use wireless link to enable computation workload migration (similar to what currently is performed in data centers, achieving latencies on the order of few hundred microseconds). Accordingly, such range of latency is expected over the wireless link in 6G. Further, 6G needs to support applications such as XR/VR-based use-cases, holographic telepresence, connected and autonomous vehicle, etc., demanding end-to-end latencies on the order of 0.1 ms.

Such extreme performance requirements (e.g., peak data rate, latency) determine UE and BS dimensioning and the air-interface design for the next generation.

There are various components contributing to the overall UP latency. For example, UE/gNB processing times, the frame alignment delay (the time from when a control/data packet is ready to be transmitted until the earliest time that there is a transmission opportunity. This delay can be due to the transmission occasion configuration for different durations or due to the slot boundary limitation or due to UL/DL link direction in TDD operation), and the transmission duration. The total budget of 0.1 ms for the 6G user-plane end to end latency, may also include one retransmission.

Accordingly, the receive processing time is expected to take ~25-30 us in total, e.g., from the RF reception to the end of decoding (e.g., may require in the order of 10× reduction compared to N1/N2 values in NR). Within this range it may be possible to further reduce the contributing factors within the processing time (N1/N2). For example, the impact from processing the control and data channels may be considered separately to reduce the impact from each component.

Currently, the UE processing times are defined based on some worst-case assumptions (on the required processing for certain maximum transport-block size (TBS), BW, etc.), which is not necessarily reflecting the actual required processing under different configurations. Particularly, UE processing times currently only vary with SCS (and DMRS configuration and resource element (RE) mapping for some cases). The dependency on BW, due to impact on channel estimation and equalization, and the dependency on TBS, due to impact on decoding, are not taken into account. Such over-estimation of the processing times is more pronounced for the extremely low-latency scenarios.

Accordingly, there is room for further optimization in this respect. Also, it is possible to define a separate set of processing times for certain configurations or schemes to address the tightest requirements. For example, possibility of service-dependent and/or UE's hardware-dependent processing times, reflecting the differences between services and UE capabilities more accurately, can be considered. Such accommodation will be discussed in more details in later sections.

Implications of High Data Rate on the Processing Time

The high peak data rate implies at least: higher processing speed, and/or larger on-die memory and cache. This means that processing speed either needs to increase such that the data can be processed and moved to the higher layers faster and without the need to increase the memory size, or memory size needs to be increased. Some embodiments may help keep the same processing speed with no impact on latency. In principle, for 10× peak data rate in 6G:

1. To keep the same processing speed as in 5G, even if the memory/cache size is 10× higher than 5G, the packet latency may increase compared to 5G. (case 1).
   Assuming the peak data-rate scenario, the packet size R can be transmitted in one slot (assuming slot length as s) in NR, with latency L. Suppose the packet size is increased to 10R (assuming 10 packets for simplicity) in one slot of 6G. Then for the 1st packet, there still is a latency of L. The 2nd packet is transmitted in the 2nd slot (note that another 10 packets arrived in 2nd slot), latency is L+s. The 3rd packet is L+2s . . . . The latency is continuously increasing since the processing capability cannot keep up with the traffic arrival (here it is assumed the flow control does not kick in. But in practice, the flow control will reduce the data rate in this case).
2. To keep the same memory/cache size as in 5G, the processing speed will need to be 10× higher than 5G and latency will be 10× lower (case 2).

While there are other approaches fitting in between, e.g., increasing the memory to some degree and also increasing the processing speed to some extent, the above two cases are the two extreme cases in order to achieve 10 times peak data rate.

Considering the memory transistor density improvement is slower than logic circuit transistor density, the modem die size of case 1 will be larger than case 2, and consequently has higher power consumption (power consumption is proportional to die size). Accordingly, in some embodiments case 2 is preferable (if achievable) as it leads to both high peak data rate, low latency, and would be better off in power consumption. For example, if a system can achieve 10× higher processing speed, the throughput and latency of 6G can be more easily achieved.

The next question is then how to increase the processing speed (case 2). In general, there are two ways to increase the processing speed (not only in communication technology, but also in computing):

- Increase operation frequency (or clock speed)
- to utilize technology such as parallelization and pipelining
  - Parallelization is to enable parallel processing in each signaling processing stage; will be explained in more details later.
  - Pipelining is to enable processing subsequent stages before completion of prior stages (5G already applies pipelining techniques). This is addressed in more detail below.

The room for increasing operating frequency in future technologies is limited. In principle, transistor size reduction will lead to increase in operating frequency. According to Moore's law, transistor size reduces by half in every 2 years (or 1.5 year), resulting in frequency doubling every two years. However, due to currency leakage issue, it is hard to further increase operating frequency.

Assuming 6G modem operation frequency can be increased to –3 GHz, there is only 3× speed up as compared to our current 5G modem, considering the silicon and manufacturing improvements in about a decade from now. But in order to achieve a 10× peak data rate a system would need a 10× speed up. The remaining speed up may be achieved by other techniques, e.g., parallelization/pipelining. NR is designed to enable pipelining. The 6G air interface design needs to further facilitate/enable/maximize parallel processing and pipelining.

Assuming a number of processing units (e.g., vector processors, etc.) are available in the hardware to perform similar or different sub-processing tasks, some of the processors may need to wait (e.g., run idle) until some other task processing ends. The purpose of pipelining is to make sure that no processing component is running idle for long periods of time, waiting for other sub-processing tasks to be completed.

By pipelining, the inter-stage processing is concerned. Proper pipelining lets the processing latency be mainly determined by the later processing stage(s). On the other hand, parallelization enables reducing the processing time of each sub-processing block/task (in addition to the benefits of pipelining). Parallel processing may be enabled for each and every stage of signal processing pipeline.

NR UE Processing Times

In the NR specification, the following have been defined:

N1: the number of OFDM symbols required for UE processing from the end of NR-PDSCH reception to the earliest possible start of the corresponding ACK/NACK transmission from the UE perspective.

N2: the number of OFDM symbols required for UE processing from the end of NR-PDCCH containing the UL grant reception to the earliest possible start of corresponding NR-PUSCH transmission from the UE perspective.

While several L1 and L2 factors contribute to the actual UE processing time, N1 and N2 values are defined as functions of SCS, DMRS position, and RE mapping (PDSCH/PUSCH resource mapping, time/frequency first mapping). Particularly, based on extended standardization discussions, it was decided that other relevant configurations are considered as the default agreed assumptions, and the N1 and N2 values were determined based on those pre-requisite assumptions.

The assumptions also targeted the highest processing demand over a single carrier (e.g., peak data-rate assumptions in terms of TBS, MCS, number of layers, etc.). In that sense, the specified N1 and N2 values represent the worst-case processing latencies across various contributing factor. This is mainly to simplify the specification as well as the scheduler's complexity. The specified UE processing times also factor in the processing time required for both the data and the control channels. Two sets of N1 and N2 values are defined, considering the default UE capability and more aggressive UE capability.

Transceiver Processing Pipeline

In the current technology design, a TB for a given transmission time interval (TTI) is divided into sub-blocks (FIG. 1), and each sub-block is encoded and modulated independently. Particularly, CB segmentation is considered to reduce decoder burden, where sub-blocks can physically be mapped on different OFDM symbols. The receiver can perform demodulating and decoding of sub-blocks in a pipeline processing manner. If each sub-block occupies some OFDM symbols and different sub-blocks are mutually independent, the structure can be interpreted as concatenated multiple short TTIs, each having a sub-block. If sub-block-based structure is enabled with one or few OFDM symbol granularity, faster processing and feedback can be possible. If the processing timeline is also on the level of OFDM symbol duration, the resulting processing timeline can be decoupled by TTI duration and can even be shorter than the TTI duration. To what level the depth of pipelining can be reached (e.g., within a certain time duration such as slot, OFDM symbol, etc.), also depends on how long each sub-processing task takes which can be reduced by parallelization.

Further, the frequency-first, time-second mapping enables low-latency and allows both Tx/Rx to process data "on the fly." For higher data-rates, there can be multiple CBs in each OFDM symbol and UE can decode the CBs received in one symbol while receiving the next OFDM symbol (without time-interleaving of CBs across TB as in NR). Similarly, assembling an OFDM symbol can take place while transmitting the previous symbols, thereby enabling a pipelined implementation.

The duration of processing for each sub-processing task per OFDM symbol may impose some bottlenecks to an efficient pipeline progress. Further, assuming that most of the processing tasks that enter the pipeline per OFDM symbol can be completed with the duration of multiple OFDM symbols (still within the TTI/slot), at the end of the TB reception, the amount of the remaining processing is still dependent on the processing duration of per-OFDM symbol sub-processing tasks (e.g., of at least the last OFDM symbol, if all prior OFDM symbol-level tasks are completed). If a later sub-processing task takes long processing time compared to an earlier task, even though the faster processing speed of the earlier task may not be fully released, depending on the traffic type, requirements, packet arrival rate, etc., there are still benefits in reducing the processing latency of even the earlier task.

In an streaming scenario where there is nearly constant incoming traffic coming, if a later sub-processing task (such as channel decoding) requires relatively longer processing time, then once the decoder block is fed by the input packets for the first time, it will stay accumulated with the processing (and likely be the bottleneck in the pipeline), and even if the processing latency of a prior task such as FFT is further reduced, the pipeline processing duration may not benefit significantly.

For low-latency small-size packets (e.g., occupying few OFDM symbols) with low traffic arrival rate (non-streaming traffic, e.g., FTP traffic, URLLC traffic, etc.), the processing latency of all components of the processing chain directly contribute to the overall packet processing latency. Accordingly, embodiments of the present disclosure may optimize the latency of each processing component.

Parallelization in Transceiver Processing Tasks

In general, parallel processing can be defined per processing task, by breaking down the specific task into parallel smaller sub-tasks. Whether the parallelization is realized in the frequency domain or in time domain, depends on how the corresponding task can be broken down, by the design and implementation.

Parallelization can be done at multiple processing stages. The degree of parallelization that can be realized for each sub processing task also depends on the extent that the air-interface design allows parallelization as well as the hardware limitations, e.g., the available number of processing cores/units (given the area, cost, and power constraints), the inter-core/thread communication overhead, etc. Assuming parallel processing, multiple parallel ongoing threads can exist in each signal processing stage. It is desired to minimize the communication among these threads to avoid incurring additional overhead. The design (of the air-interface, as well as the hardware) may then minimize communication among parallel threads. Accordingly, while parallelization is highly correlated with the implementation, from the next generation air-interface design perspective, a primary goal is to allow/enable the highest degree of efficient parallelization without an infeasible increase in terms of the area, power, and cost.

Parallelization may also be scalable to scale with packet size, so that even for small packets/resource blocks a system can also apply parallel processing. In some cases, the small packets are the ones targeted for low latency cases in most scenarios.

Further, while for certain scenarios batch processing may be preferred from the efficiency perspective, it is not desired for the future technologies, since it requires additional waiting time to collect a batch of input data to process and undermines the latency benefits enables by pipelining and parallel processing.

Parallelization in Frequency Domain

Looking into the major receive processing tasks, it is noted that current NR air-interface design, already allows to break down and parallelize several sub-processing tasks, with certain granularities in the frequency domain. There are few functions in the transceiver without such property. This means that even though the overall workload may scale with the BW, for a capable hardware (e.g., with multiple processing units), it is possible (at least for some processing tasks) to benefit from the frequency domain parallel processing.

Examples of baseband (BB) components of digital transceiver processing that are already parallelizable (and potentially vectorizable) without any additional design impact, include the channel estimation that can be parallelized in units of PRG (as will be detailed later), demodulation/equalization that can be independently performed for each subcarrier, and the LDPC processing which can be virtually parallelized over the CBs. Parallelization in these sub-processing tasks can be achieved without any information exchange or interdependency or communication overhead and delay between the different processing blocks. On the other hand, for some processing tasks such as the FFT, the processing is not internally parallelizable or vectorizable with no communication overhead between the processing units (more details about the FFT block will be provided in a separate section). As such, with increasing the BW, the size of the required FFT/iFFT is increased (due to increased number of subcarriers), which results in increased processing workload without possibility of enabling parallelization. From this perspective, FFT/iFFT block may be seen as a bottleneck in realizing full parallelization in each of the processing tasks.

In some cases, even though for the LDPC decoding task on a single CB and the communication between cores/parallel units in multi-core block-parallel or in row-parallel decoder imposes implementation limitations, here the focus is on interdependencies across the processing blocks, (e.g., CBs), which is avoided when concurrently processing different CBs with potentially parallel decoders. In this sense, LDPC processing of multiple CBs can be virtually parallelized.

It is noted that even though it is currently possible to parallelize on subcarrier level or resource block level, the receiver still needs to receive a full encoded block (over the time and frequency resources), to be able to perform the block processing, as the smallest unit of receiver's output is the code-block. The timing of the CB reception is also related to the specifics of the waveform design, the implementation to realize parallelism, and many other factors. it can be challenging to parallelize the process in frequency domain, due to impacts and requirements on the FrontEnd (FE) of BB processing, etc. This will be also explained in more details later in the current disclosure. In general, the design goal for future technologies may be to enable parallelization at every stage of processing pipeline, including the FE, etc.

Packet Processing and Granularity of Sub-Processing Tasks

Physical layer packet processing includes different sub-processing tasks, where the granularity of Physical layer packet processing includes different sub-processing tasks, where the granularity of each sub-processing task can be different, e.g., OFDM-symbol-level, Code-Block (CB)-level, Transport-Block (TB)-level, etc. Examples of processing tasks per OFDM-symbol, include FFT (once per OFDM symbol, for OFDM-based waveforms), equalization based on the estimated channel (per all Sub-Carriers (SCs) in an OFDM symbol), DFT precoding in DFT-s-OFDM, and decoding (if boundaries of group of CBs will be aligned to the boundaries of group of OFDM symbols, as explained in the next section). CB-level processing tasks include the encoding/decoding tasks, e.g., CB CRC, LDPC encoding/decoding, (de-)rate-matching and (de-)inter-leaver, which are performed once per code-block. As mentioned above, with further restriction it is possible to align CB boundaries to one OFDM symbol which eases pipelining It is also possible that integer numbers of FDMed CBs fit within one OFDM symbol. To what extent CB-processing within one OFDM symbol can be parallelized depends on the number of parallel processing-units (decoder blocks) in the hardware and how much the decoder hardware reuse can be considered. This needs to make the resource mapping aware of CB boundaries, as will be discussed later. Currently, not many decoders may be available to run in parallel (based on some back-of-the-envelope calculations of the achievable NR LDPC throughput, the observation is that in NR, at least two decoders are needed to achieve the required peak throughput). Still, with indicating the available number of decoder units in the hardware, it is possible for the scheduler to try to map proper number of CBs to maximize the benefits of parallel CB processing.

Code-Block Alignment to OFDM Symbol

In order to allow efficient pipelining at the transceiver to reduce the overall processing time, several aspects have been accommodated in the design of 5G NR air-interface. Still, there are some further considerations that can be reflected in the design of future generation, to fully enable efficient pipelining. One such aspect is the relationship between the OFDM symbol and code blocks. Particularly, aligning the boundaries of groups of integer number of CBs (e.g., CB group—CBG) to the boundaries of integer number of OFDM symbols (symbol group), can ease the pipelining. The most restrictive case is enforcing the CBG boundaries to one OFDM symbol to further facilitate the pipelining, since it allows parallelized CB processing within each OFDM symbol, e.g., in case of high-BW and high data-rate.

Particularly, since the channel decoding is likely the most time consuming processing task and also for higher data-rates, a TB is segmented into multiple CBs, this alignment allows one symbol to carry multiple CBs across the scheduled BW and allows for parallel processing of the multiple CBs. While processing of the CBs depends on the number of decoder blocks, e.g., it is hardware dependent, the CB alignment, enables a capable HW to take advantage of its parallel processing capability within each OFDM symbol.

It is noted that the processing speed of each decoder block (decoding latency) is not impacted with CB alignment, while the intention is to facilitate pipelined processing across CBs (to help with reduced TB processing). Lastly, such accommodation has impact on CBS and TBS determination and scheduler's resource mapping.

Vectorizable Sub-Processing Tasks

As mentioned earlier, for functional block such as frequency domain (FD) equalization or channel estimation, frequency domain samples can be processed completely in parallel without any information interaction between different processing block. The functional blocks that cannot be vectorized are blocks that require information to be jointly computed. For example, an FFT block, by definition, requires all input samples in order to produce an output sample (in the other domain):

$$x[k] = \sum_{n=0}^{N-1} u[n] e^{-\frac{j2\pi nk}{N}}.$$

Ideal parallelism can be achieved if input memory can be disaggregated, and information blocks can be processed completely independently from each other, which is not possible for FFT, unless parallel FFT blocks process separate segments of the frequency spectrums, with separate RF/BB chains, as will be discussed later.

The channel estimation (CE) task may be done per each resource element (RE) in the frequency domain, and how much parallelization is achieved, depends on the implementation. For example, for frequency domain channel estimation, a frequency domain filter with certain tap-length is required. For example, for MMSE channel estimation, a corresponding covariance matrix (e.g., a filter) needs to be applied in frequency domain. While the tap length in frequency domain can be different, it is possible to perform the filtering operation across different components of the frequency at the same time, by breaking apart the frequency segments. Such parallel processing can be realized by using vector processing units. Accordingly, the overall latency of the channel estimation task may be determined by the number of cycles required to complete a single sub-task operation, if the circuitry allows for enough number of processing units.

Currently, in frequency domain, a UE can be given some guidance on correlation in the reference signals, in the form of physical resource-block groups (PRGs). As such, one currently possible UE implementation for the channel estimation is PRG-based channel estimation. Particularly, there is a concept of precoding granularity (over a PRG) which determines the maximum number of contiguous PRBs that the UE may use for channel estimation, e.g., the UE may assume same DL precoder and exploit this in the CE process, while no assumptions made between the PRGs. There is a trade-off between the precoding flexibility and the CE performance (range of CE interpolation filter which determines the diversity gain): a large PRG size can improve CE accuracy at the cost of less precoding flexibility and vice versa. NR supports PRG sizes of two and four PRBs as well as wideband PRG where the PRG is equal the scheduled BW size. The UE is not allowed to perform cross PRG channel estimation. For example, for a PRG size of two PRBs, the UE can only perform CE within two adjacent pair of PRBs, as the precoder may change on the next pair. Further, while the network indicates the UE the precoder granularity, it is still up to the UE implementation which precoding granularity to use (smaller than or equal to the indicated granularity). For example, even if wideband precoder is indicated, UE is still allowed to perform a channel estimation with a smaller granularity, such as per-PRB channel estimation (e.g., in case it has some RF issues, etc.). As such, from the air-interface perspective, the current design allows for breaking down the channel estimation task and realize parallel processing in the frequency domain. Again, the actually realized degree of parallel processing depends on the implementation and the available number of processing units.

Now considering the task of channel equalization, it is noted that the equalization may be performed per tone (e.g., per subcarrier), for each OFDM symbol. Technically, it is possible to process all the tones in parallel, using a larger circuit space to perform vector processing (since there is no dependency between the operations across the tones). As such, even the current technology design allows for parallelization of the equalization and channel estimation tasks. Hence, any limitation on the degree of parallelism that can be realized, may mainly be imposed by the implementation/platform (at least for an OFDM-based waveform).

As mentioned earlier, for such vectorizable (a special type of parallel processing) tasks, there is no communication overhead limitation. Particularly, as such sub-processing tasks involve naturally parallel operations over independent inputs, enabling vector processing. As such, parallel processing can be realized without extra concern or limitations from inter-core/processor communication.

However, for processing tasks, such as FFT/IFFT, or per-CB LDPC decoding, the communication between the cores or the parallel units impose limitations (the complexity of routing network, the memory handling, etc.), as there is interdependencies between the parallel units. For such processing tasks, it may be possible to introduce virtually parallel blocks for processing. As mentioned earlier, through the introduction of CB, LDPC encoding/decoding task across CBs are independent and can be easily parallelized. Further, since it is possible for future technologies to align the boundaries of the CBs and the OFDM symbols, parallel processing across CBs can be considered as breaking down the decoding task over each OFDM symbol and parallelize in frequency domain. On the other hand, for FFI/iFFT blocks, since each element of the output vector is a function of all the inputs, it is not straightforward to introduce virtual parallelization across segments of the bandwidth.

Overall, physical-layer sub-processing tasks that are involved in the receiver pipeline, have different natures resulting in different handling/capabilities in terms of parallelization.

FFT Processing. Implementation, and Latency

As discussed in earlier sections, FFT/iFFT blocks may not be fully parallelized/vectorized, since they require all the input information to be jointly processed in order to compute the output.

The choice of FFT implementation is a function of multiple factors—overall KPIs (Area/Power/uArch), form factor, the number of component carriers, number of antennae, etc., for the UE as a whole. The implementation also needs to consider area/power versus latency tradeoffs. The FFT Implementation can be done using hardware accelerators using dedicated radix engine instances or even using CPUs/GPGPUs depending on the form factor and the power/area constraints for the UE, as well as the process technology on which the FFT is implemented (which can provide a gain on the frequency front as well. This automatically provides a reduction in processing latency).

Most efficient forms of FFT implementation (in terms of memory utilization and logic count), leverage factorization of the input and output, which subfactors the input into smaller radix portions for processing and will require iterations to compute the entire output sample vector.

Currently, the method of factorization and use of parallel radix-K engines at each stage, satisfies the design requirements with reasonable implementation factors. The value of K and the number of parallel radix-K primitive engines are functions of latency targets as well as the hardware area. There can be multiple implementation variants in NR design. For example, for NR low latency FFT/iFFT implementation, a radix-16 engine as base primitive with 1 engine per stage, meets latency requirements in an area-efficient manner. For example, for a 4096-point FFT, 16×16×16 implementation can be considered. The factorization is a function of FFT sizes to be supported, which in turn is a function of SCS/BW combination requirements of UE. For example, if the UE needs to support only 2 k and 4 k, the applied factorizations can be 16×16×8 and 16×16×16 only when using a radix 16 engine (with last stage being reconfigurable).

While on the BB receiver's FFT input front, the engine is limited by the incoming I/Q sampling rate. The FFT implementation may consider setting the clock frequency for the FFT processing to be the same as the maximum supported sampling rate. Alternatively, if the sampling rate is low, the IQ samples may be buffered and then sent to the FFT hardware engine in bursts, so that the FFT processing block can operate at higher clock frequencies independent of sampling rate. In either case, the IQ entering the BB only arrives at the sampling rate and that latency cost will be incurred in the system budget.

On the BB receiver's FFT output front, it is up to the design to determine how fast to consume the outputs. This is an implementation-specific attribute on the parallelism front on how many parallel outputs can be streamed out every cycle and is a function of the consumer of the FFT/iFFT engines as well as degree of parallelism within the engine.

An example latency assessment for a 4096-point FFT may result in roughly 550 clock cycles in low-latency variant implementation, from the point of receiving the last input sample to FFT engine from the digital front-end, to the first output sample. Particularly, 256 clock cycles are required to produce each of the 1$^{st}$ and 2$^{nd}$ stage outputs (time sharing only 1 radix-16 engine in each stage), resulting in total 512 clock cycles for the first two stages. The 3$^{rd}$ stage latency is different from the first two stages, being computed and streamed out on the fly.

In the example implementation where the clock frequency for FFT processing is the same as the maximum supported sampling rate (e.g., 122.88 Msps), this results in FFT processing latency of 550*8.14*1e-9 sec=4.477 usec. The FFT processing latency defines the pipeline start and determines when the decoder block(s) can be fed (especially if the decoder(s) are currently idle, e.g., at the beginning of the processing, or when the traffic is intermittent, in between the data arrivals, etc.). while the exact structure of the pipeline and the impact from FFT processing latency depends on the exact implementation of FFT and other processing blocks, there is value in reducing FFT latency.

There may be different approaches to reduce the FFT processing latency. From the air-interface design perspective, it may be possible to partition the processing BW and confine the blocks of data within such partitions, such that smaller size FFT blocks process the BW partitions, in parallel. This is discussed in more details in the next section. On the other hand, for an FFT implementation using hardware accelerators, it may be possible to increase the number of parallel engines, which is directly a factor of reduction in latency of the corresponding stage, at the cost of the same factor increase in area/power consumption, as well as reduction in memory efficiency due to the parallel memory accesses needed.

In general, there may be a tradeoff between speeding up the processing and the power consumption, and the design may consider proper compromise between the two. The overall cost (in terms of HW/area/power) of the two approaches may be assessed carefully for certain use-cases.

This disclosure proceeds by describing embodiments directed to enabling/facilitating the parallelization of transceiver processing tasks in frequency domain, targeted to address low-latency requirements of future cellular technologies.

Embodiment: Allowing FFT Splitting by Air-Interface Design

As mentioned earlier, while major baseband processing blocks are currently parallelizable (either by nature or through some virtual accommodation), for FFI/iFFT blocks since each element of the output vector is a function of all the input elements, it is not straightforward to introduce parallelization across independent sets of inputs with disaggregated memory. Instead, especially for high-BW and high data-rate scenarios, in one embodiment, the bandwidth of a single component carrier is partitioned to allow multiple smaller size FFT blocks to process the BW partitions (herein also called sub-bands).

In such cases, an integer number of CBs (from the group of CBs that fit entirely within one OFDM symbol) can be mapped into the frequency resources of each FFT partition, to be processed and output independently. From the resource mapping perspective, it is noted that NR data mapping considers TB BW, and not CB or CBG BW. Particularly, CB/CBG boundaries are not currently a determining factor in resource allocation, e.g., scheduling decision in FD is in granularity of PRB (not in granularity of CB/CBG BW, and CB and PRB boundaries may not be aligned). As discussed previously, currently the boundaries of CB and OFDM symbols are not aligned either. This means CB does not determine/impact the time domain or frequency domain scheduling decision.

Further, the PRG size may also be aligned to the boundaries of FFT partition to confine the precoding assumption. This implies alignment of boundaries of a group of integer number of CBs to a group of PRBs or to a PRG, as well. With these restrictions, each partition of the BW can be processed independently and in parallel, if the receiver hardware supports multiple processing chains. Even if the receiver does not have multiple of full processing chains, e.g., if it has fewer number of decoder blocks compared to the number of supported smaller size FFTs, such partitioning may still have benefits in terms of the latency, as the pipeline's start is shifted and the decoders can be fed faster compared to the case without FFT splitting (which has higher FFT latency). Still, within the pipeline, in cases (e.g., traffic types) at least a number of CBs equal to the number of parallel decoders are usually expected to be available to be decoded, there may not be much latency gains (when the number of decoder blocks is less than the number of FFT blocks).

In one example, the number of FFT blocks is dimensioned based on the envisioned number of decoder blocks. As an example, currently an NR UE may have few decoder blocks (, e.g., 2) which may run in parallel. Then, at least in the beginning of the packet reception, e.g., for the first OFDM symbol, until the FFT for the whole BW is performed, it may be the case that at least one decoder may be idle, e.g., the current number of FFT partitions (=1) is less than the number of parallel decoder blocks, and potentially much less than the number of CBs per OFDM symbol.

As noted previously, since BB tasks of CE, equalization, and decoding are already parallelizable in the frequency domain without specification/design impact (in units of PRG, RE, CB, respectively), the splitting may mainly benefit the FFT latency. Particularly, per CB processing is not expected to be reduced, while per TB processing may be reduced, since the splitting can facilitate (parallel) processing of CBs within a TB.

In terms of the amount of overall computations, an example of a comparison shows ~20% less computation for 4×1k-FFT compared to 1×4k-FFT for a typical case. The advantage in terms of the number of operations, also translates to latency and likely, the power consumption as well. Additionally, since the multiple FFT blocks are expected to run in parallel, this implies significant overall latency compared to the case of one large-size FFT block, especially since the multiple independent FFTs of smaller size intend to process different sub-bands separately with no interconnection between the FFT blocks.

On the other hand, if the TB payload size does not include multiple CBs, e.g., for a single-CB TB, the gains from such approach may be limited. Still, it may be possible that for certain use-cases, the scheduler decides to segment the TB into smaller CBs in order to enable benefits from the UE's parallel processing capability, at the cost of some potential performance loss (since the decoders performs better over larger code blocks) which itself may be marginal especially over favorable channel conditions.

Figure 2A:
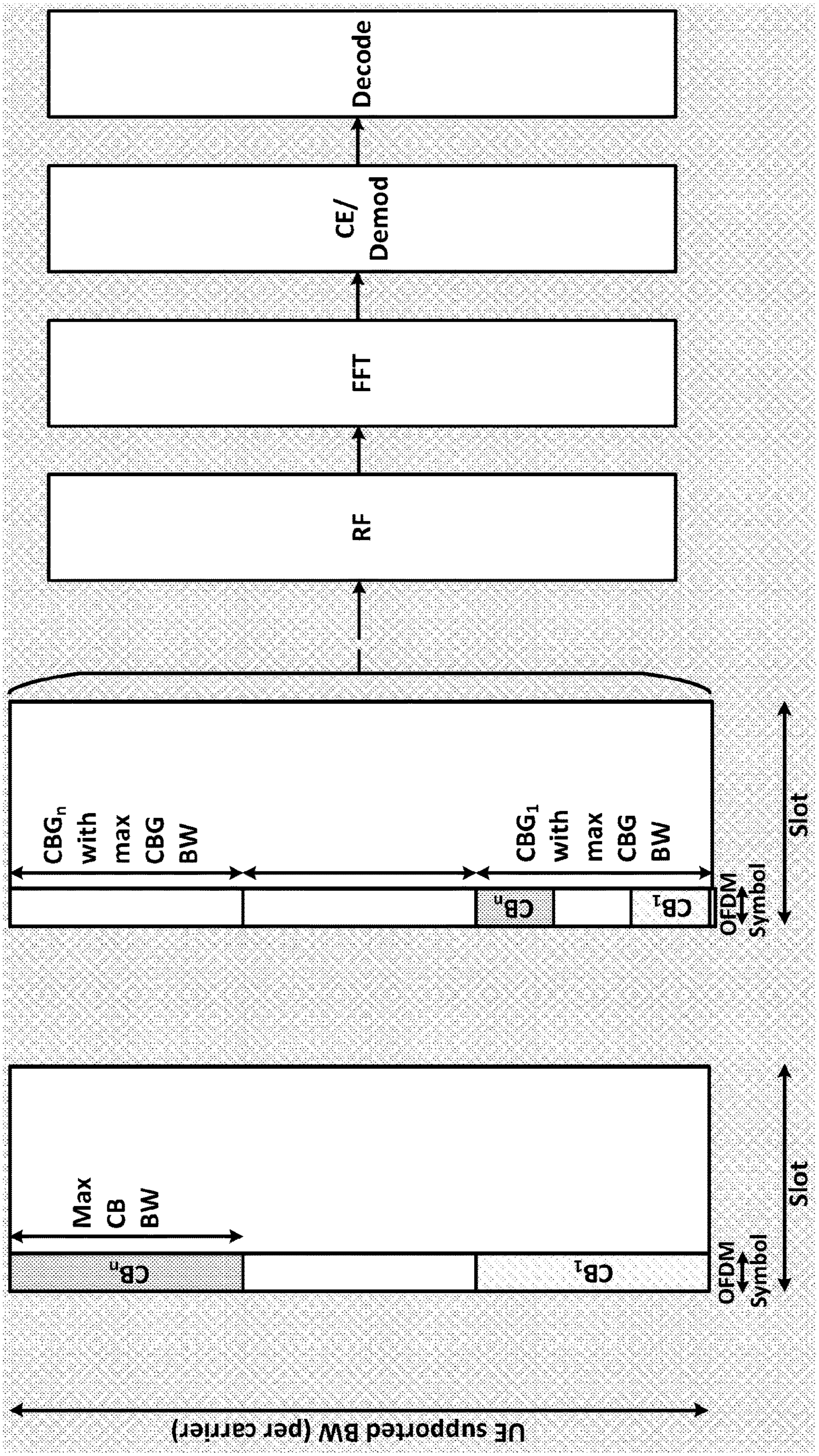
FIG. 2A illustrates an example of a baseline Rx processing chain in accordance with various embodiments.
Figure 2B:
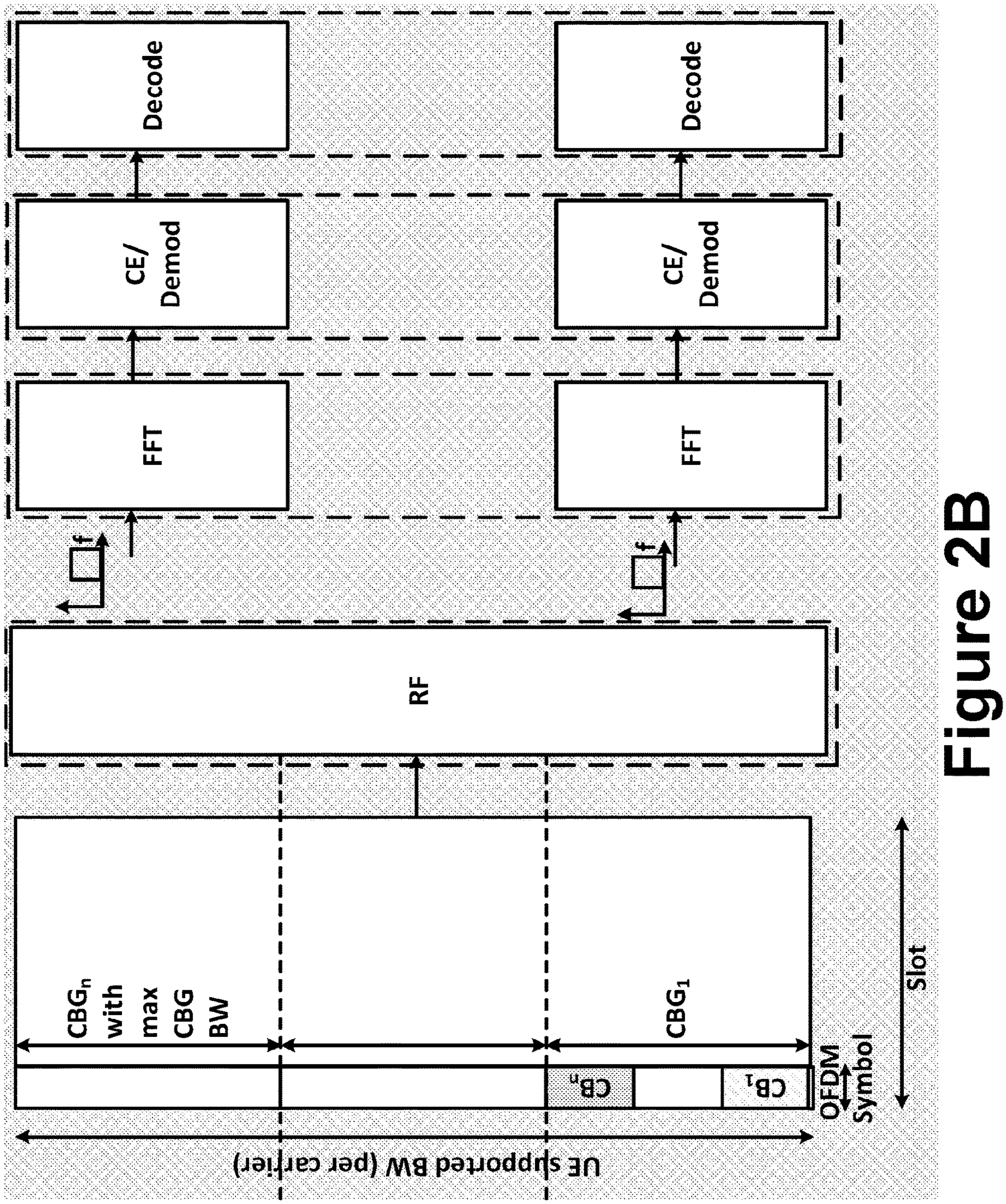
FIG. 2B illustrates an example of multiple FFTs with single RF and sharp filtering in accordance with various embodiments.
Figure 2C:
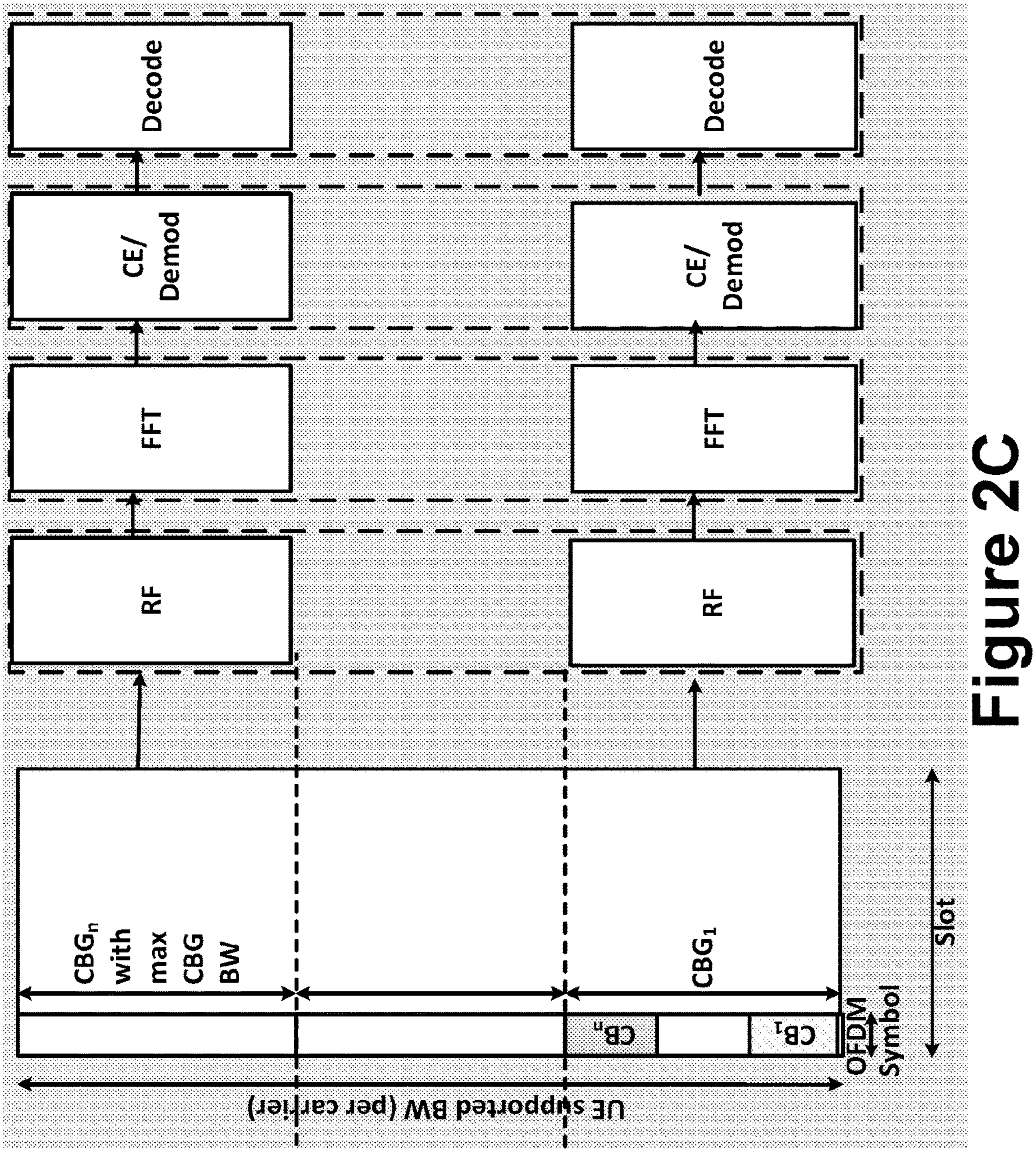
FIG. 2C illustrates an example of multiple FFTs with multiple RFs in accordance with various embodiments.

In terms of the RF requirements, it is noted that employing multiple FFT blocks (e.g., M FFT blocks) within the scheduling BW of a single component carrier, requires either M multiple ADC and RF chains (one corresponding to each FFT block) or one wideband ADC and RF with M sharp/ideal digital pass-band pre-filtering (FIG. 2). The former may require additional power to sustain and process signals, as well as the complexity and cost involved in supporting multiple RF chains, while the latter may require multiple wideband digital ideal filter processing, which may be hard/expensive to implement. Further, with any filtering (in analog or digital domain), residual out-of-band interferences (anti-aliasing) may still exist which may require support of guard-bands, reducing the system efficiency. There are other solutions such as the use of filtered-OFDM, which may complicate the implementation, and their practicality may depend on the state-of-the-art RF and silicon technologies.

Although there may be concerns about increasing the power consumption due to the analog or digital pre-filtering, multiple RF chains, etc., in certain implementations, from the ADC perspective, there may be savings in term of the power consumption when applying multiple smaller BW lower frequency ADC blocks compared to one wide-band higher frequency ADC. As such, depending on the power consumption of the other blocks (e.g., additional RF filtering before ADC, etc.), and considering that the ADC is one of the major power consuming blocks in FE RF Rx (and its power consumption may increase exponentially after around a few 100 MHz), the overall power consumption may or may not increase compared to the single monolithic implementation of RF and FFT blocks. It is noted that the overall power consumption and the requirements can be also dependent on the use case. Further, depending on the demand and motivation towards supporting certain use cases, certain implementations with careful compromises may still be feasible for a particular use-cases. Lastly, it is noted that one implementation/architecture is not expected to fit or be feasible for every scenario, and specific scenarios may have optimized implementation.

In summary, partitioning the FFT within a single component carrier (while requires certain design considerations on resource mapping and puts some limitations on the scheduler as mentioned above), may also impose potential implementation costs. Depending on the use-case of interest, the cost of FFT splitting may include increased hardware complexity, logic size/area, and power (due to analog or digital pre-filtering, multiple RF chains, etc.) and potential resource inefficiency (to consider guard bands) or alternatively, implementation of sharp pass-band filters. However, some such costs may be justified for certain use-cases and scenarios.

Example of Extending the Above Embodiment: Modular Implementation

Having elaborated the pros and cons of the FFT splitting approach, one potential additional benefit may also exist for introducing FFT splits to process segments of the BW. Let's assume that the number of FFT blocks and the number of decoder blocks can be envisioned such that the UE implementation supports multiple self-contained/independent BB processing chains. This means that the design allows for modular device implementation and extension, which may make the chip design simpler (e.g., to support extended BW, the implementation requires adding more chains). Such approach can be attractive from the product design perspective.

Expanding on this last potential benefit, each sub-band may also support different capabilities. For example, some sub-bands may support eMBB traffic, while some other may support URLLC traffic. Consequently, if in some vertical scenario only URLLC support is required, only URLLC modules are integrated, or if both URLLC and eMBB support are required, the implementation can consider mix and match integration of the different modules with different capabilities, each with properly dimensioned BW. Overall, a device may support a potentially wide BW by aggregation of multiple sub-bands, where each band may support a different service. This approach can help speed up the production of chipset or network.

Relationship Between FFT Splitting and Carrier-Aggregation (CA)

Although currently the multi-carrier technology naturally supports parallel processing of TBs across the component carriers (CCs) (as currently, different TBs are mapped to different CCs), 6G requirements demand that even within each component carrier, the design needs to enable further pipelining and parallel processing of each TB, with minimized overhead and latency. In NR UE processing time determination, per TB processing has been assumed. As such, CA capability, while increases the throughput, does not help with reducing the UE processing time. In fact, when defining NR UE processing times, one carrier was assumed.

As discussed earlier in detail, even by current technology design, it is possible to process multiple CBs in parallel, depending on the hardware capability. Particularly, the design allows for parallel processing for most of the BB components, such as the channel estimation, the equalization, and the decoding. FFT splitting introduced in the previous section, further expands the possibility of parallel processing to the FFT domain as well.

In NR, it is possible for the network and the UE to support different BW capabilities. CA has also been a means for UEs with less hardware capabilities to support wider BWs (via network's CA configuration/activation/de-activation, with the associated signalling/latency overhead).

In general, depending on the characteristics and the RF requirements of the frequency bands in CA, as well as UE's hardware capabilities, the UE may support the aggregated BW via single or multiple RF and/or BB components. For example, it is possible that a UE supports CA with single RF chain and single FFT block, single RF chain and multiple FFT blocks, multiple RF chains and multiple FFT locks, etc.

One aspect in the support of CA, especially the intra-band contiguous CA (CCA), is handling unwanted signals within the band of interest, such as interference and out-of-band signals from the adjacent bands, etc. NR supports intra-band contiguous CA and, in such cases, allows two CCs to be merged without any guard band in between. However, the gNB and/or the UE may or may not use two separate Tx/Rx branches and separate BB processing chains for each carrier to support such operation. Particularly, UEs processing intra-band contiguous CC reception may not necessarily be implemented with parallel RF and/or BB processors. As such, it may not be possible or straightforward at least in all scenarios or implementations, to rely on leveraging CA capability (from the hardware implementation/capability perspective) for single band processing (e.g., it may not necessarily be assumed that UE's capability to support CA means the UE support multiple processing chains which can be also used for the splitting approach and parallel processing in frequency).

Adaptable UE Processing Times

When targeting reduction of UE processing time to satisfy the low-latency requirements, there are two main directions to follow. One is to ensure that the air-interface design allows for/enables maximum degree of pipelining of the transceiver processing as well as parallel processing within each processing component/task, to help reducing the overall processing time. Previous sections discussed ideas with respect to such direction. Another direction is to help ensure that the UE processing time values are dimensioned/characterized/adjusted to realistically/accurately reflect the required processing load/time,

- without over/under-estimation of the actual expected processing workload for each scenario,
- taking into account the actual UE's hardware capability, and
- taking into account the channel condition, the scheduling parameters, and configurations.

In this section, ideas on ensuring proper dimensioning of UE processing times are discussed and disclosed.

Embodiment: Application/Requirements/Service-Based UE Processing Times

As mentioned previously, NR UE processing times are dimensioned to ensure handling of the peak workload (the worst-case). In future technologies, while some application may require the peak data-rate and very low latency at the same time, there are still services/applications which require extremely low latency, but do not require peak data-rates at the same time (e.g., extreme URLLC type of traffic). For such use-cases, in one embodiment, smaller processing times can be dimensioned, with assumptions/constraints/conditions to limit/regulate the supported peak workload e.g., by considering restricted TBS sizes or maximum supported TBS and/or the number of CBs in a TTI or in an OFDM symbol, and/or the rank, and/or the scheduled BW/data-rate and/or the supported packet sizes, or by limitation in terms of the percentage of the peak throughput relative to the peak-rate supportable by UE, applicable for particular use-case(s) or service(s). The intention here is to define UE's processing times based on the actual processing load expected in a use-case/scenario, since the worst-case processing load assumptions do not hold in all use-cases, and the UE processing times may be reflective of it.

It is noted that the throughput depends on various component factors, not all with similar level of impact on the UE processing load. Restricting the maximum scheduled BW for some scenarios, can help in reducing the channel estimation and equalization efforts, as well as the number of CBs to be decoded. On the other hand, for many low-latency use cases, use of large allocations in the frequency domain can be a key enabler. Thus, any significant restriction on the maximum allocated BW in order to support very short processing times may defeat the purpose of the overall latency reduction, and any such restriction may be carefully dimensioned.

The values of N1 and N2 can have direct impact on URLLC system performance and considering reduced N1/N2 values under certain conditions, may improve the outage capacity, at the potential cost of the peak and/or average throughput of URLLC services. In one example, the ratio of the scheduled DL/UL information bits within a scheduling timeframe over the maximum information bits that can be scheduled within the scheduling timeframe, can be a function of UE's capability (e.g., N1 and N2 values). If such ratio is less than 100%, then the UE may use the same hardware to process the scheduled DL/UL information bits within a scheduling timeframe, faster. For example, the UE processing time for a given scheduled DL/UL information, can be obtained as a function of the above ratio as well as N1 and N2 values. In a simplified example, and assuming that N1 and N2 values are defined assuming maximum information bits scheduled within the scheduling timeframe, the actual UE processing time can be computed by multiplying the above ratio and N1 or N2 values.

As mentioned earlier, while several L1 layer and L2 layer processing factors contribute to the actual UE processing time, N1 and N2 values are only defined as functions of SCS, DMRS position, and RE mapping. Such inaccurate reflection of actual UE processing burden, for some cases results in overestimating the UE processing times. For example, while NR supports certain simplifications in terms of L2 processing for low-latency use-cases, this has not been reflected in the dimensioned UE processing times. One such simplification is enabled by the support of L2 protocol pre-processing. Particularly, mapping restriction between logical channel (LCH) and configure grant (CG) resource in Rel-16 NR, enables UE to pre-populate the L2 headers (PDCP/RLC/MAC) based on its knowledge on the traffic pattern and the mapping between QoS flow→DRB→CG resource. As such, most of the L2 procedures can be bypassed for certain services, reducing L2 processing time. Therefore, overall user plane latency can be reduced. In one example, reduced processing times for CG-based URLLC traffic can be defined to properly reflect the simplifications in terms of L2 processing.

In another example, for semi-persistent scheduled (SPS) and/or CG-based transmissions, smaller processing times are dimensioned, to reflect the less burden from PDCCH processing. On the other hand, unlike NR where the low-latency use cases are seldom combined with the extremely high throughput requirements, some envisioned applications for the next generation require low-latency and high throughput at the same time. This means that the restrictions on the peak throughput may not be applicable to all low-latency applications. For such scenarios, it is beneficial to dimension the number of scheduled CBs, e.g., per OFDM symbol, based on actual UE's hardware capabilities, e.g., in terms of the number of decoders that can run in parallel, etc. This will be discussed in a later section. In some cases, defining separate sets of UE processing times for different use-cases/applications, services, and configurations to address different requirements may be unavoidable.

Embodiment: UE Processing Times Based on Channel Conditions, Scheduling Parameters Such as Code-Rate/MCS/CQI/TBS, and PDCCH Configurations The actual packet decoding latency (which is a significant part of the overall UE receiver processing time) depends on the number of code-blocks to be decoded (per OFDM symbol or per TTI, e.g., in a TB), as well as the latency of decoding each CB. The latency of decoding each CB is a function of the processing technology that the hardware is implemented on and its clock frequency, as well as the number of clock cycles that it takes to decode a CB. This latter depends on the structure of the LDPC decoder in terms of the number of edges in the corresponding LDPC base-graph. Incremental-redundancy hybrid ARQ (HARQ) in NR, has been supported through a special LDPC structure which is based on a core base-graph for the highest supported code-rate, as well as expansion of it through adding more parity check bits for lower code-rates. This structure implies lower number of edges for higher code-rates, and higher number of edges as the effective code-rate (e.g., upon IR combining) decreases. The lowest supported code-rate corresponds to the maximum number of edges in the base-graph. This means that lower code-rates (e.g., larger soft-buffer size) require higher amount of edge processing, resulting in higher latencies. However, this has not been reflected in NR UE processing times, where the processing times have been equally defined for all code-rates, any number of CBs to be decoded, etc. NR processing times have been dimensioned to accommodate the worst-case processing loads (e.g., in terms of the code-rate and the number of LDPC edges to be processed, the number of CBs, etc.).

In future technologies, UE processing times can be dimensioned more realistically, e.g., based on the channel condition and the scheduling parameters. As the link-adaptation parameters, e.g., CQI/MCS (and code-rate), are functions of channel conditions, the UE processing times can effectively be defined/determined based on the channel quality. For example, in scenarios/channel conditions where less transmission errors are expected, lower processing latency can be achieved. The network estimates, or calculates, or looks up the UE's processing time (based on the channel conditions and scheduling decisions/configurations) to envision/schedule resources for transmission of ACK/NACK feedbacks as well as re-transmission (if needed).

In the example where the processing time is dimensioned based on the code rate of the selected channel coding scheme, the ACK/NACK time domain offset can then be different depending on the number of HARQ (re)transmissions. For example, for the initial transmission, the ACK/NACK time domain location relative to the associated transmission can be closer since the effective code rate is higher. For the HARQ retransmission, the ACK/NACK time domain offset can be larger since the effective code rate is decreased.

As mentioned earlier, UE processing times factor in the processing time required for both the data and the control channels, and in order to achieve smaller processing times, methods to reduce the processing burden of each of data and control channel may be considered. For example, considering PDCCH processing/decoding contribution to UE processing, in some embodiments, schemes with sequence-based DL control information for certain traffic types/deployment scenarios/use-cases with extreme low-latency requirements may be used in order to reduce PDCCH processing burden.

In the context of the current disclosure, it is noted that for PDCCH monitoring, blind decoding, and reception, a UE needs to perform channel estimation over several control channel elements (CCEs). Depending on the CORESET size, the number and aggregation-level (AL) of the PDCCH candidates, etc., the actual channel estimation burden may vary. Higher aggregation levels may be used in cases with less favorable channel conditions, to provide coding gains. In one embodiment, UE processing times (e.g., the portion corresponding to the data channel processing) can be dimensioned based on the distribution of ALs and/or any other configurations related to PDCCH processing which is mainly determined based on channel conditions. As such, scenarios and channel conditions with reduced need for higher aggregation levels, result in lower processing times.

Embodiment: UE Processing in Units of CB

In NR, UE processing times are defined considering the time required to process and decode a TB (transmitted over a slot or sub-slot). The number of CBs to be decoded over a TTI or over an OFDM symbol, depends on the MCS/CQI, maximum TBS, maximum BW, the number of UEs to be scheduled, etc. In future technologies, in one example embodiment, UE processing times (e.g., the portion corresponding to the data channel processing) can be determined/defined on a per-CB, and if/when necessary, be scaled to reflect the total packet processing latency/load. In one such example, UE's CB-level processing capability can be defined as a function of MCS or code-rate.

In another example, the UE may indicate to the network, how much time it requires to process certain amount of information, e.g., a CB with certain size, code-rate, etc., the base station can accordingly schedule the original transmission as well as resources for UE to report ACK/NACK, etc.

If per-CB processing is set as the unit to assess the overall packet processing time, the scheduler/network can take into account what it schedules for a UE (in terms of the number of CBs [per TTI or OFDM symbol], as well as the CQI/MCS which impact the decoding time per CB), to scale and map the CB-processing-time to a corresponding overall (e.g., per-TB) processing latency. The network can then envision/schedule the ACK/NAC resources and resources for the re-transmission, accordingly.

Here, per-CB processing is to let the scheduler have a more accurate understanding of UE's processing capability. It's not to limit/define ACK/NACK granularity. For example, it may be the case that ACK/NACK is per a group of CBs, and the processing time for that group can be computed based on the per-CB processing. Even though whether ACK/NACK is per CB or per CBG, can be separate from the current discussion, it may make sense to define the processing time requirement with external testable behavior. If CB level processing requirement is defined, but only have ACK/NACK per CBG, then it may also be proper to define how to derive CBG level processing time requirement e.g. based on CB level processing time requirement.

If CB level processing means that the corresponding ACK/NACK is also per CB, then the ACK/NACK feedbacks may also be transmitted consecutively in time domain. Particularly, assuming CB-level ACK/NACK and that CB has the granularity of OFDM symbol, then the corresponding ACK/NACK can be transmitted in consecutive/adjacent OFDM symbols.

It is also worth noting that in future technologies, the concept of TB may have less pronounced importance compared to the current technologies. Accordingly, it may be the case that the processing tasks are defined on CB level (as the necessity/benefit/importance of TB-level tasks such as TB-level CRC, etc., may be deprioritized), which makes the per-CB processing time unit more reasonable/motivated.

Further, the approach of defining/determining per-CB processing time, is aligned with the need to have a more collaborative understanding of UE processing capabilities and assessment of actual UE processing time, as will be discussed in the next section.

Embodiment: Dimensioning Processing Times Based on UE's Hardware Capability Reporting/Indication As discussed in the prior sections, several factors play a role in determining UE processing load, e.g., the scheduled BW, TBS, number of CBs, MCS/CQI, etc. At the same time, UE's capability, e.g., in terms of the number of available decoder blocks that can run in parallel, the number of RF chains that can run in parallel, the number of FFT blocks (if multiple exists; then the scheduler may consider mapping CBs to allow FFT splitting), etc., significantly impacts the processing latency. For example, a UE may be able to exploit parallel processing of independent CBs, while another UE may not. The UE processing may be more reflective of the actual processing required and the actual hardware capabilities. NR specified processing times are not reflective of all such contributing/impacting factors, in order to keep the design simpler, and also avoid additional complexities in scheduler.

In one embodiment, UE indicates its capability in terms of one or multiple of the following:

- the number of decoder blocks,
- the number of available FFT blocks and their max sizes,
- the number of available RF chains/components, the number of available analog or digital pass-band filters and/or the number of available ADC units,
  - each, potentially with the corresponding operating frequencies or frequency boundaries,
  - with any guard-band requirements between adjacent RF chains/components.

For example, a UE's hardware capability indication may take into account the overall capability across carriers if from the RF requirement perspective, the corresponding processing units can also operate in parallel even within a single carrier bandwidth. This also reveals the importance of reporting any guard-band requirements as well, as it lets the network know if any gap in between the scheduled blocks are required.

In one example, the more detailed/informative/involved capability indication, can be achieved via defining more detailed categories of UE capabilities compared to NR, where UE can indicate an index to a list of capabilities.

The network then schedules based on its scheduling algorithms while taking UE's maximum processing capability (e.g., in performing parallel processing, etc.) into account if/when possible. The network then estimates, or calculates, or looks up the UE's processing time to envision/schedule resources for transmission of ACK/NACK feedbacks as well as re-transmission (if needed).

In summary, this embodiment supports better alignment in network's understanding of UE's true processing capabilities via more elaborate UE processing capability indication (e.g., parallel processing capability, the number of available decoder blocks (to decode multiple CBs at the same time), the number of available RF chains/components, the number of available FFT blocks, etc.). The scheduler not only can take into account such information in making scheduling decision, such as determining/adjusting:

- UE's scheduling BW over a carrier,
- TBS/CBS determination,
- CB segmentation,
- CB resource mapping,
- the number of scheduled CBs over an OFDM symbol, etc.,
  - (if/when possible), but also it can compute/determine the actual UE processing time, knowing both the exact UE's processing capabilities as well as the processing load it schedules for the UE.

In one example, considering that in one OFDM symbol, integer number of CBs are scheduled, from the pipelining and latency point of view, it is preferred to process those CBs with parallel decoding blocks as much as possible. The network may optimize its CB determination/segmentation and resource mapping, based UE's indication of its decoding capability.

While such mechanism may complicate the scheduling decisions (as it may try to accommodate different UEs' capabilities), in order 6G's low-latency requirements, some compromises may be unavoidable.

Further, considering the same scheduling BW for a UE and the same modulation order (e.g., the same amount of scheduled information to be processed, e.g., over an OFDM symbol), enforcing adjustment of CB size/number based on UE's parallel decoder blocks, may result in some decoder's performance loss/gain, as the LDPC may have better performance with larger CB sizes. Here, the intention is letting the scheduler decide about the exact dimensioning of the size and number of CBs (e.g., scheduled over an OFDM symbol) for each UE, given that information on maximum parallel processing capability has been provided and the system desires to leverage the knowledge of UE's processing capability and adapt to UE's processing capabilities as much as possible. It is noted that currently, the scheduler decisions may mainly intend to optimize the performance (e.g., based on UEs' measurement reporting). However, in future technologies, in order to achieve certain processing latencies, the scheduler can adapt/adjust its decisions to jointly optimize performance, latency, spectrum utilization and resource efficiency, as much as possible.

Especially, considering multiple UEs with potentially different hardware processing capabilities in MU-MIMO scenarios, it may be difficult/infeasible for the scheduler to accommodate all UEs' optimized processing and adapt the scheduling decisions exactly to their maximum processing capabilities. For example, the scheduler may end up providing smaller number of CB (e.g., in an OFDM symbol) than the maximum parallel decoding capability a UE has indicated.

In one example, AI-based scheduler collects UEs' capability indications as inputs and makes scheduling decisions such that the resulting latency, performance, and resource efficiency meet certain requirements or are jointly optimized as much as possible. For example, using reinforcement learning, in a simulation environment, the scheduler can learn from its actions (e.g., scheduling decisions) and adjust its decisions based on the resulting processing latency (which can be derived/known by the scheduler based on UEs' indicated capabilities), the observed performance, and potentially the resulting resource efficiency.

Parallel Processing Across Multiple Active BWPs:

In one example, the UE may be able to leverage its hardware processing capabilities in supporting CA, in order to perform parallel processing in a single carrier BW and accordingly indicate its parallel processing capability to the network. In an extended example, the UE can indicate its capability in supporting multiple simultaneous BW parts (BWPs), where the network can accordingly configure the UE's BWPs (this is can be similar to current UE capability indication of it maximum supported BW and network configuring the scheduled BW). In one example, if UE's hardware/RF capability require some gaps in between the resources assigned to be processed in parallel, the network reflects that when configuring the BWPs.

Defining Multiple Sets of N1/N2 Values

A UE's capability indication of one N1/N2 pair from a defined set of multiple N1/N2 values can be seen as a simplified example of the proposed approach in this section. However, it is noted that the main idea here is to let the UE indicate its maximum hardware processing capability in terms of one or multiple factors, and then provide the scheduler the freedom to schedule and assign resources within a range of choices for multiple UEs. Then, based on its scheduling decision, the scheduler to estimate the UE processing times (in order to schedule ACK/NACK and re-transmissions, etc.). Please note that as discussed throughout the document, the actual required processing time can indeed be a function of scheduling parameters/decisions as well as the UE's hardware capability.

The proposed approach allows for more flexible/granular yet more realistic UE processing times, as well as more flexibility in scheduling decisions. For example, it may also happen that the UE indicates its N1/N2 values based in its maximum processing capability but the scheduler cannot schedule to use UE's maximum capability, and it needs to assess the actual processing time based on what it has scheduled.

On the other hand, if multiple N1/N2 values are defined and the UE indicates one pair from the set as its capability, it means that (similar to NR), there may be some underlying (likely fixed) assumptions on the scheduled load/parameters for these values to be decided. As such, the values cannot be reflective of the actual scenario. It is also possible to define multiple sets of N1/N values, e.g., as functions of #decoders/#FFTs, #RF chains, etc., and the UE indicates one N1/N2, based on its capability. Further, if the UE is to leverage CA capability within single carrier, this means different N1/N2 values may be defined for single/multiple carriers. However, the assumptions on the scheduled processing load, etc. are likely fixed, not allowing for realistic dimensioning of the UE processing time. Once again, it is noted that UE's processing time in reality depends on what/how the scheduler schedules, e.g., in terms of the number of scheduled CBs, how the CBs are mapped, etc. Defining multiple sets of N1/N2 values for UEs with different processing capabilities, regardless of the scheduled processing load results in unrealistic dimensioning of UE processing times. In one example, multiple sets of N1/N2 values may be defined for each UE's hardware capability, depending on different scheduling decisions/parameters, the number of scheduled CBs, etc.

Systems and Implementations

Figure 3:
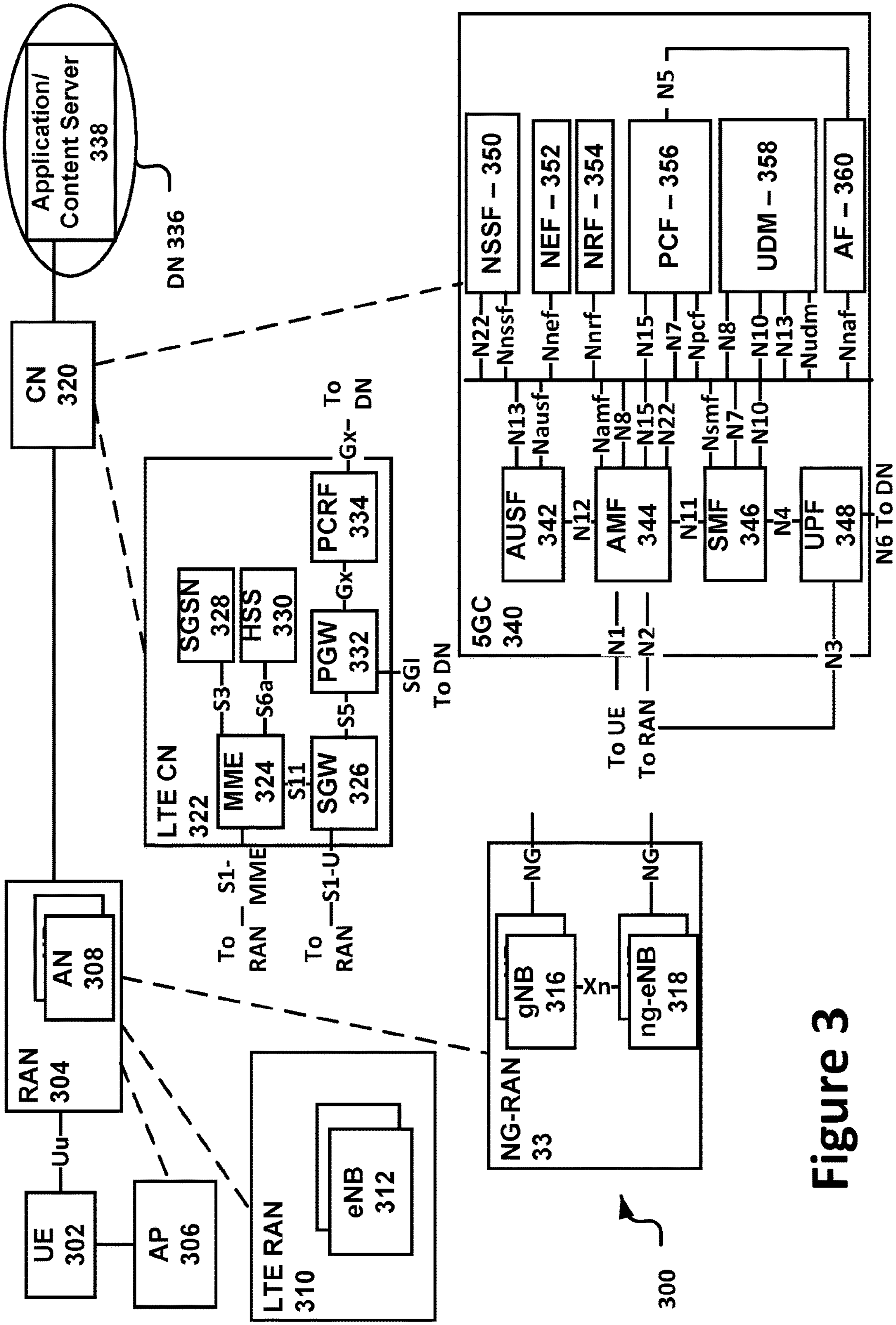
FIG. 3 schematically illustrates a wireless network in accordance with various embodiments.
Figure 4:
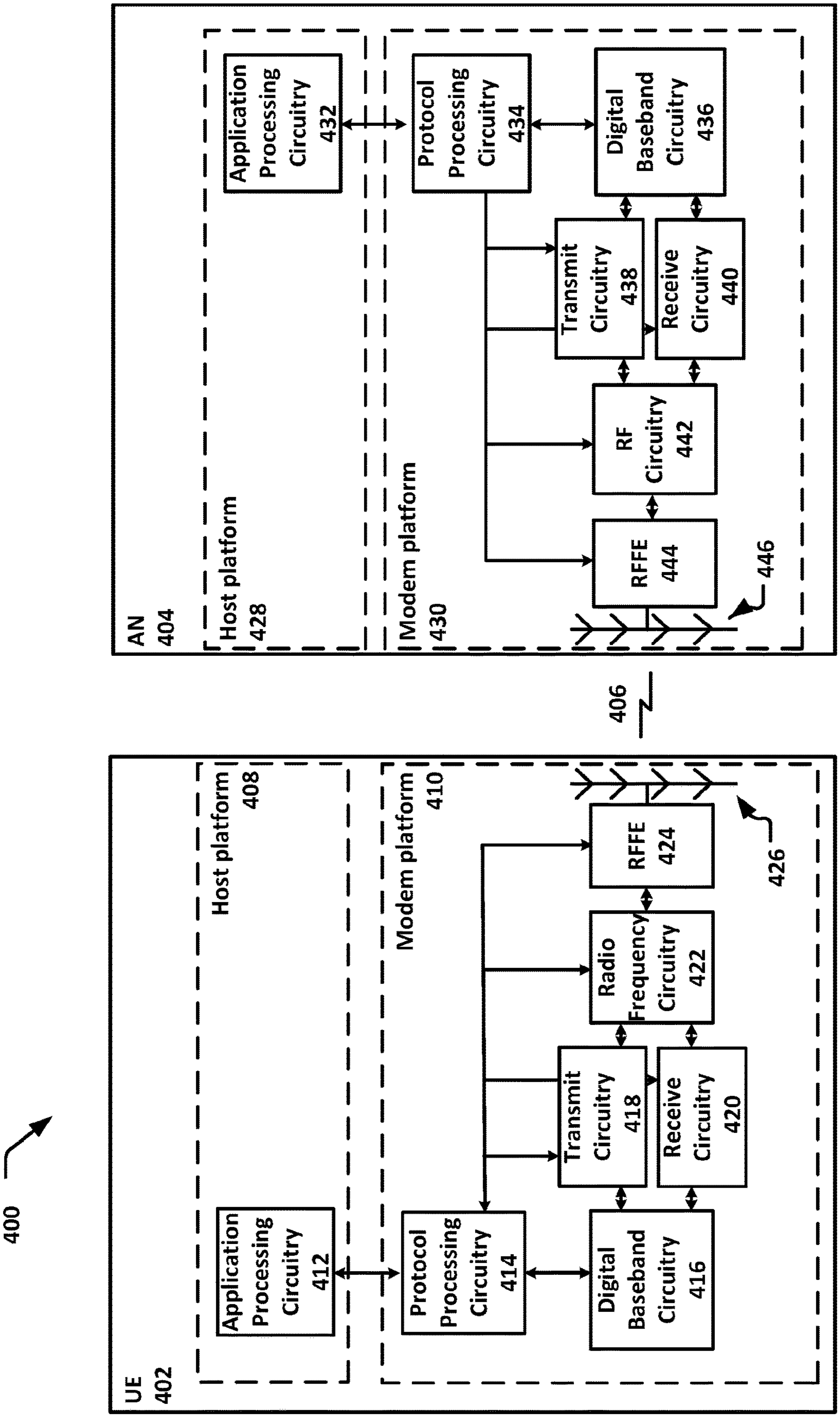
FIG. 4 schematically illustrates components of a wireless network in accordance with various embodiments.
Figure 5:
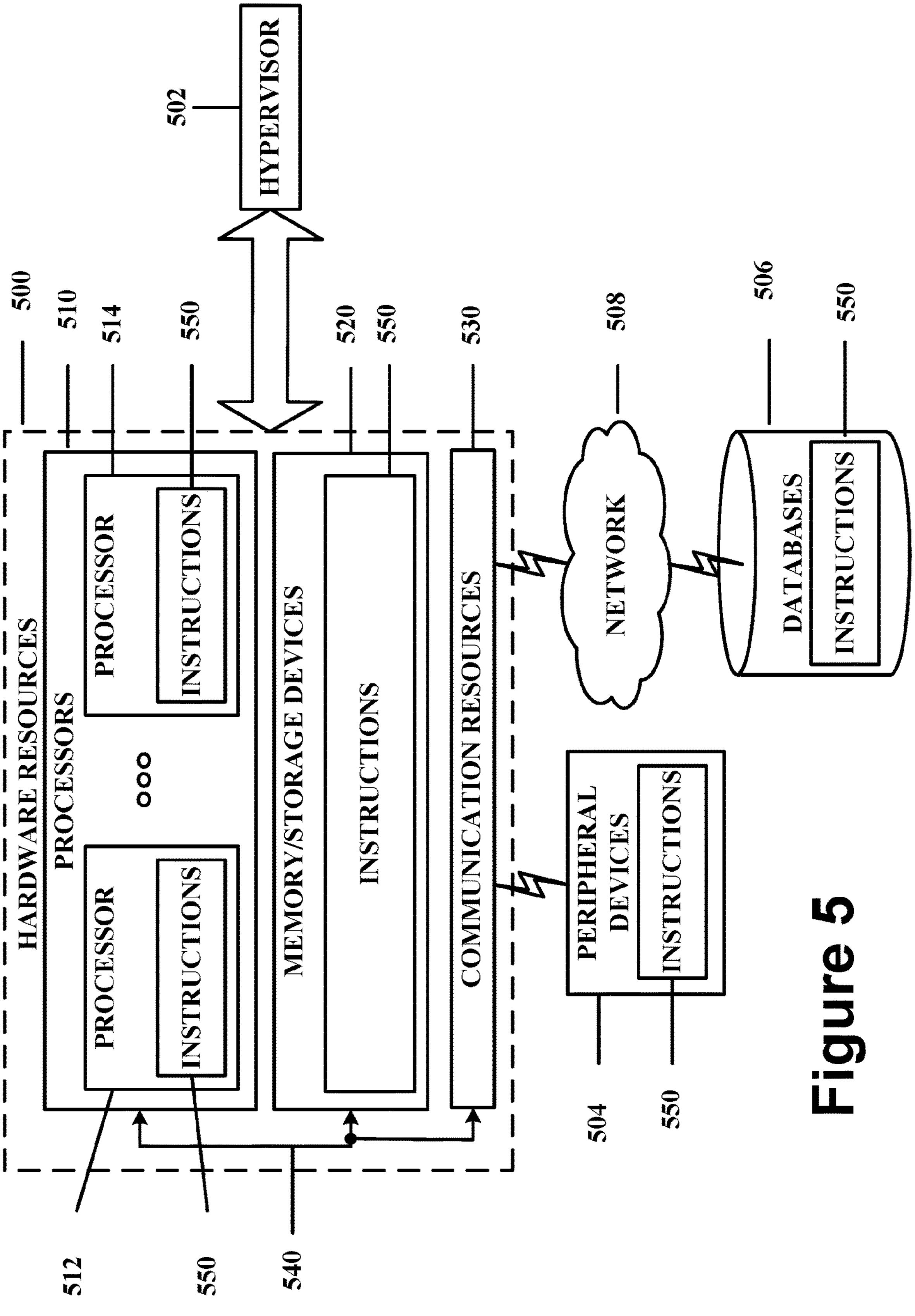
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 3-5 illustrate various systems, devices, and components that may implement aspects of disclosed embodiments.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be communicatively coupled with the RAN 304 by a Uu interface. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an S1 interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350 may also determine allowed NSSAI and the mapping to the subscribed S-NSSAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3$^{rd}$ party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHz frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Example Procedures

In some embodiments, the electronic device(s), network(s), system(s), chip(s) or component(s), or portions or implementations thereof, of FIGS. 3-5, or some other figure herein, may be configured to perform one or more processes, techniques, or methods as described herein, or portions thereof.

Figure 6:
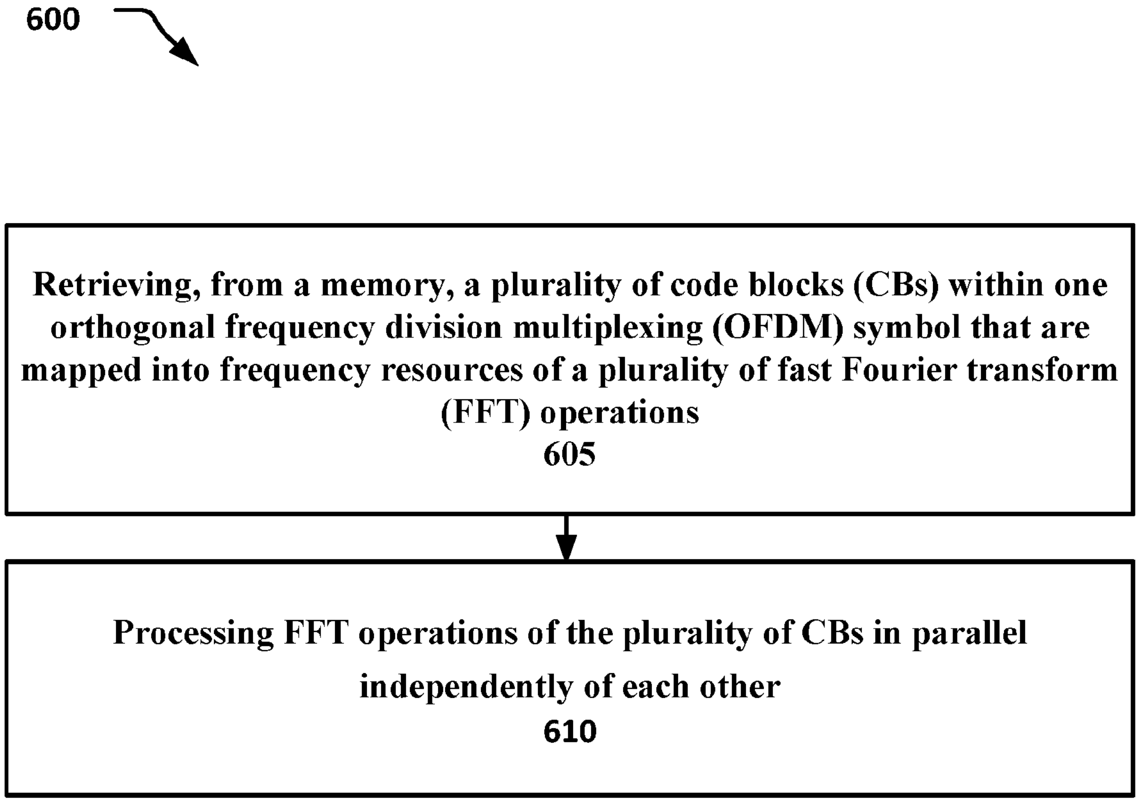
FIGS. 6, 7, and 8 depict examples of procedures for practicing the various embodiments discussed herein.

One such process is depicted in FIG. 6. In this example, process 600 may be performed by a user equipment (UE) or a portion thereof. For example, the process may include, at 605, retrieving, from a memory, a plurality of code blocks (CBs) within one orthogonal frequency division multiplexing (OFDM) symbol that are mapped into frequency resources of a plurality of fast Fourier transform (FFT) operations. The process further includes, at 610, processing FFT operations of the plurality of CBs in parallel independently of each other.

Figure 7:
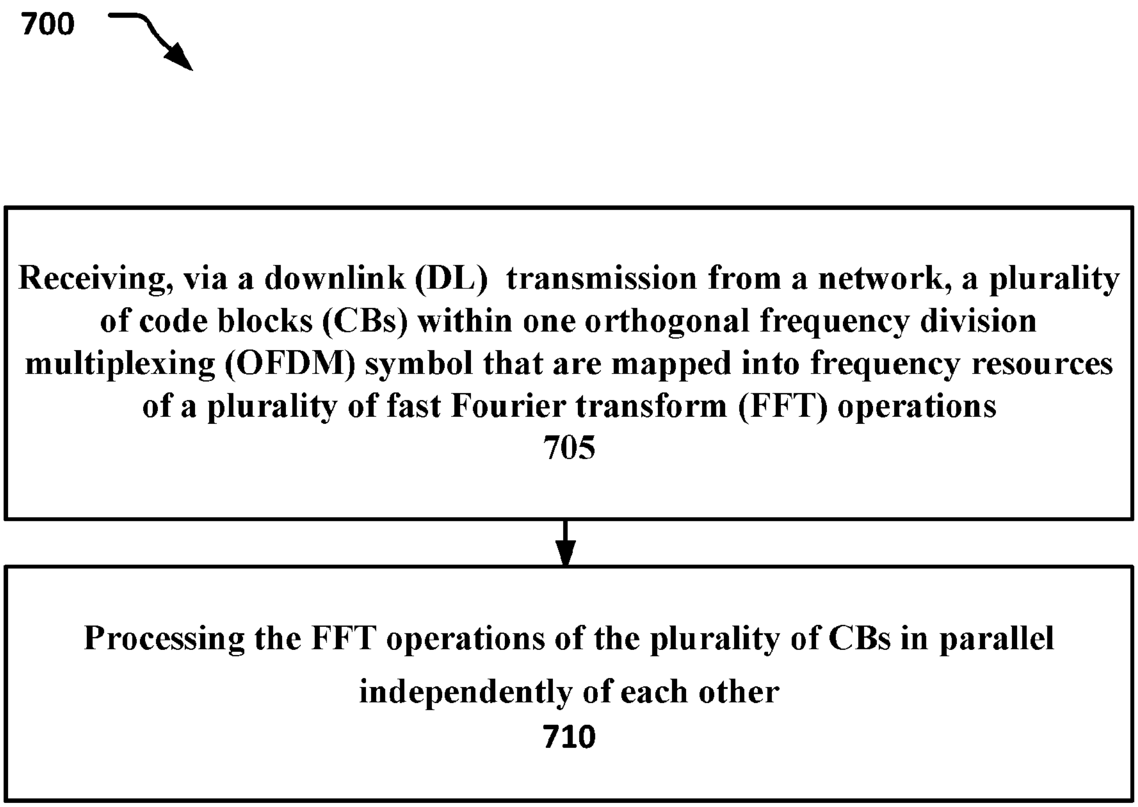

Another such process is illustrated in FIG. 7. In this example, process 700 includes, at 705, receiving, via a downlink (DL) transmission from a network, a plurality of code blocks (CBs) within one orthogonal frequency division multiplexing (OFDM) symbol that are mapped into frequency resources of a plurality of fast Fourier transform (FFT) operations. The process further includes, at 710, processing the FFT operations of the plurality of CBs in parallel independently of each other.

Figure 8:
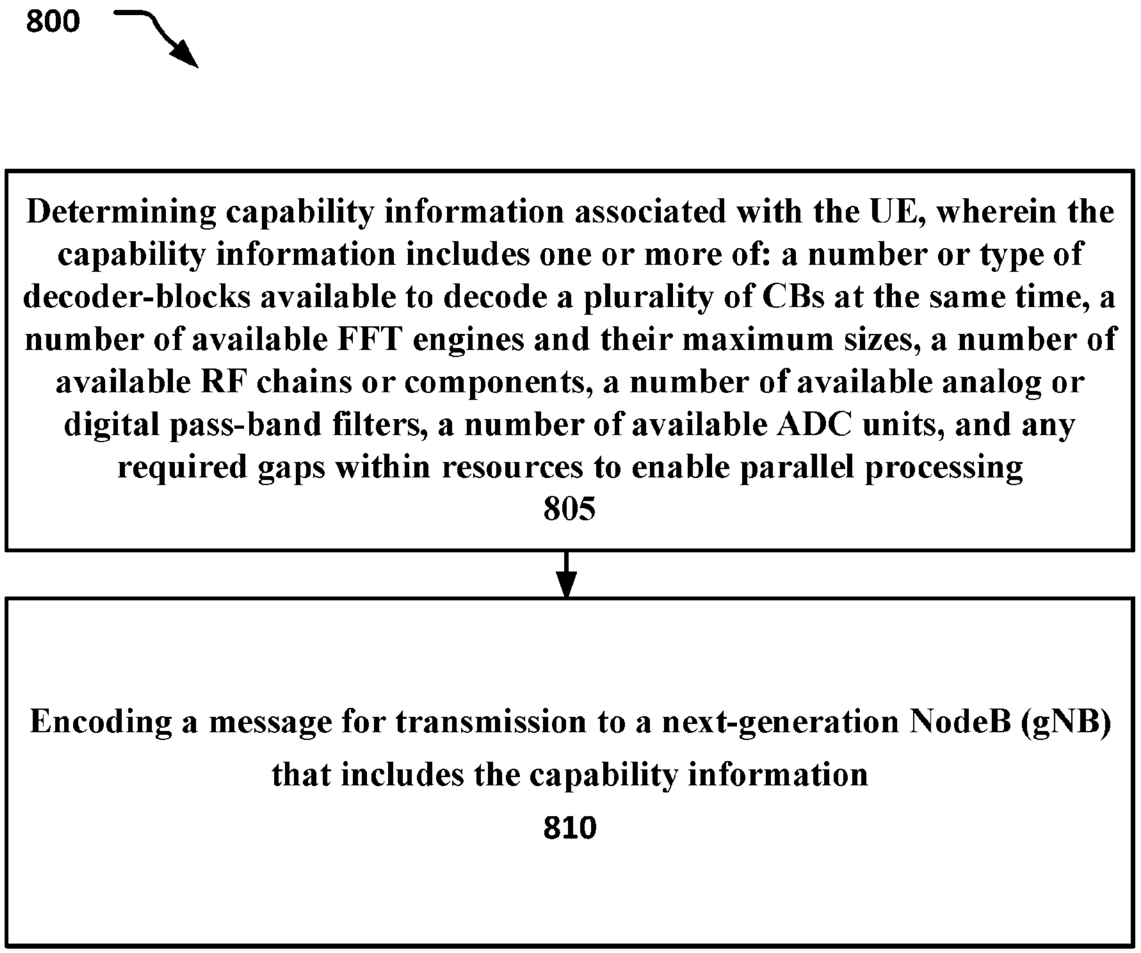

Another such process is illustrated in FIG. 8, which may be performed by a UE in some embodiments. In this example, process 800 includes, at 805, determining capability information associated with the UE, wherein the capability information includes one or more of: a number or type of decoder-blocks available to decode a plurality of CBs at the same time, a number of available FFT engines and their maximum sizes, a number of available RF chains or components, a number of available analog or digital pass-band filters, a number of available ADC units, and any required gaps within resources to enable parallel processing. The process further includes, at 810, encoding a message for transmission to a next-generation NodeB (gNB) that includes the capability information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the examples section.

EXAMPLES

Example 1 may include a transmission and reception method for low-latency requirements in wireless communication system with FFT operation required as part of the frequency domain processing, wherein the bandwidth of a single component carrier is partitioned to allow multiple smaller size FFT blocks to process the BW partitions (also called sub-bands). Integer number of CBs (from the group of CBs that fit entirely within one OFDM symbol) are mapped into the frequency resources of each FFT partition, to be processed and output independently. PRG size may also be aligned to the boundaries of FFT partition to confine the precoding assumption (alignment of boundaries of a group of integer number of CBs to a group of PRBs or to a PRG, as well).

Example 2 may include the method of example 1 or some other example herein, wherein the number of FFT blocks is dimensioned based on the envisioned number of decoder blocks which may run in parallel.

Example 3 may include a transmission and reception method for services/applications which require extremely low latency but do not necessarily require peak data-rates at the same time (e.g., extreme URLLC type of traffic), wherein smaller processing times are dimensioned based on the actual processing load expected in the use-case/scenario, with assumptions/constraints/conditions to limit/regulate the supported peak workload e.g., by considering restricted TBS sizes or maximum supported TBS and/or the number of CBs in a TTI or in an OFDM symbol, and/or the rank, and/or the scheduled BW/data-rate and/or the supported packet sizes, or by limitation in terms of the percentage of the peak throughput relative to the peak-rate supportable by UE.

Example 4 may include the method of example 3 or some other example herein, wherein the ratio of the scheduled DL/UL information bits within a scheduling time-frame over the maximum information bits that can be scheduled within the scheduling time frame, can be a function of UE's capability, e.g., N1 and N2 values. If such ratio is less than 100%, then the UE may use the same hardware to process the scheduled DL/UL information bits within a scheduling timeframe, faster. For example, the UE processing time for a given scheduled DL/UL information, can be obtained as a function of the above ratio as well as N1 and N2 values. In a simplified example, and assuming that N1 and N2 values are defined assuming maximum information bits scheduled within the scheduling timeframe, the actual UE processing time can be computed by multiplying the above ratio and N1 or N2 values.

Example 5 may include the method of example 3 or some other example herein, wherein reduced processing times for CG-based URLLC traffic is defined reflecting the simplifications in terms of L2 processing.

Example 6 may include the method of example 3 or some other example herein, wherein for semi-persistent scheduled (SPS) and/or CG-based transmissions, smaller processing times are dimensioned, to reflect the less burden from PDCCH processing.

Example 7 may include a transmission and reception method for wireless communication wherein the device's UE processing times is dimensioned based on the channel condition and the scheduling parameters. As the link-adaptation parameters, e.g., CQI/MCS (and code-rate), are function of channel conditions, the UE processing times can effectively be defined/determined based on the channel quality. For example, in scenarios/channel conditions where less transmission errors are expected, lower processing latency can be achieved. The network estimates, or calculates, or looks up the UE's processing time (based on the channel conditions and scheduling decisions/configurations) to envision/schedule resources for transmission of ACK/NACK feedbacks as well as re-transmission (if needed).

Example 8 may include the method of example 7 or some other example herein, wherein UE processing times (e.g., the portion corresponding to the data channel processing) is dimensioned based on the distribution of ALs and/or any other configurations related to PDCCH processing which is mainly determined based on channel conditions. As such, scenarios and channel conditions with reduced need for higher aggregation levels, result in lower processing times.

Example 9 may include a transmission and reception method for wireless communication wherein the device's UE processing times is determined/defined on a per-CB, and if/when necessary, is scaled to reflect the total packet processing latency/load.

Example 10 may include the method of example 9 or some other example herein, wherein UE's CB-level processing capability can be defined as a function of MCS or code-rate.

Example 11 may include the method of example 9 or some other example herein, wherein the UE may indicate to the network, how much time it requires to process certain amount of information, e.g., a CB with certain size, code-rate, etc., the base station can accordingly schedule the original transmission as well as resources for UE to report ACK/NACK, etc.

Example 12 may include a transmission and reception method for wireless communication wherein the device indicates its capability (e.g., with respect to parallel processing) in terms of one or multiple of the following:

- the number of decoder blocks (to decode multiple CBs at the same time),
- the number of available FFT blocks and their max sizes,
- the number of available RF chains/components, the number of available analog or digital pass-band filters and/or the number of available ADC units,
- each, potentially with the corresponding operating frequencies or frequency boundaries,
- with any guard-band requirements between adjacent RF chains/components.

The network then schedules based on its scheduling algorithms while taking UE's maximum processing capability (e.g., in performing parallel processing, etc.) into account if/when possible. The network then estimates, or calculates, or looks up the UE's processing time to envision/schedule resources for transmission of ACK/NACK feedbacks as well as re-transmission (if needed).

Example 13 may include the method of example 12 or some other example herein, wherein the scheduler not only can take into account such information in making scheduling decision, such as determining/adjusting UE's scheduling BW over a carrier and/or TBS/CBS determination and/or CB segmentation and/or CB resource mapping and/or the number of scheduled CBs over an OFDM symbol, etc. (if/when possible), but also it can compute/determine the actual UE processing time, knowing both the exact UE's processing capabilities as well as the processing load it schedules for the UE.

Example 14 may include the method of example 12 or some other example herein, wherein UE's hardware capability indication may take into account the overall capability across carriers if from the RF requirement perspective, the corresponding processing units can also operate in parallel even within a single carrier bandwidth.

Example 15 may include the method of example 12 or some other example herein, wherein the more detailed/informative/involved capability indication, can be achieved via defining more detailed categories of UE capabilities compared to NR, where UE can indicate an index to a list of capabilities.

Example 16 may include the method of example 12 or some other example herein, wherein considering that in one OFDM symbol, integer number of CBs are scheduled, from the pipelining and latency point of view, it is preferred to process those CBs with parallel decoding blocks as much as possible. The network may optimize its CB determination/segmentation and resource mapping, based UE's indication of its decoding capability.

Example 17 may include the method of example 12 or some other example herein, wherein the UE may be able to leverage its hardware processing capabilities in supporting CA, in order to perform parallel processing in a single carrier BW and accordingly indicate its parallel processing capability to the network.

Example 18 may include the method of examples 12 or 17 or some other example herein, wherein the UE can indicate its capability in supporting multiple simultaneous BW parts (BWPs), where the network can accordingly configure the UE's BWPs (this is can be similar to current UE capability indication of it maximum supported BW and network configuring the scheduled BW).

Example 19 may include the method of examples 12 or 17 or some other example herein, wherein if UE's hardware/RF capability require some gaps in between the resources assigned to be processed in parallel, the network reflects that when configuring the BWPs.

Example 20 may include the method of example 12 or some other example herein, wherein AI-based scheduler collects UEs' capability indications as inputs and makes scheduling decisions such that the resulting latency, performance, and resource efficiency meet certain requirements or are jointly optimized as much as possible.

Example 21 may include the method of example 20 or some other example herein, wherein using reinforcement learning, in a simulation environment, the scheduler can learn from its actions (e.g., scheduling decisions) and adjust its decisions based on the resulting processing latency (which can be derived/known by the scheduler based on UEs' indicated capabilities), the observed performance, and potentially the resulting resource efficiency.

Example 22 may include a transmission and reception method for wireless communication wherein multiple sets of device's UE processing times (e.g., equivalents to N1/N2 values) may be defined for each UE's hardware capability, depending on different scheduling decisions/parameters, the number of scheduled CBs, etc.

Example 23 includes a method of a user equipment (UE) comprising:

- receiving a downlink (DL) transmission from a network, wherein the DL transmission includes a plurality of code blocks (CBs) within one orthogonal frequency division multiplexing (OFDM) symbol that are mapped into frequency resources of a fast Fourier transform (FFT) partition; and
- processing the plurality of CBs in parallel independently of each other.

Example 24 includes the method of example 23 or some other example herein, wherein the DL transmission is a physical downlink shared channel (PDSCH) or physical downlink control channel (PDDCH) transmission.

Example 25 includes the method of example 23 or some other example herein, wherein a physical resource block group (PRG) size is aligned to boundaries of the FFT partition.

Example 26 includes the method of example 23 or some other example herein, wherein boundaries of the CBs are aligned to a group of physical resource blocks (PRBs) or to a PRG.

Example 27 includes the method of example 23 or some other example herein, wherein boundaries of the plurality of CBs are not aligned with the OFDM symbol.

Example 28 includes the method of example 23 or some other example herein, wherein a number of FFT blocks is dimensioned based on a number of decoder blocks.

Example 29 includes the method of example 23 or some other example herein, wherein processing the plurality of CBs includes segmenting a transport block (TB) into smaller code blocks (CBs) for parallel processing.

Example 30 includes the method of example 23 or some other example herein, wherein processing the plurality of CBs includes splitting the FFT partition to process bandwidth (BW) segments.

Example 31 includes the method of example 23 or some other example herein, wherein a time for processing the plurality of CBs is based on a transport block size (TBS).

Example 32 includes the method of example 23 or some other example herein, wherein a time for processing the plurality of CBs is based on a number of CBs in a transmission time interval (TTI).

Example 33 includes the method of example 23 or some other example herein, wherein a time for processing the plurality of CBs is based on a number of CBs in an OFDM symbol.

Example X1 includes an apparatus comprising:

- memory to store a plurality of code blocks (CBs) within one orthogonal frequency division multiplexing (OFDM) symbol that are mapped into frequency resources of a plurality of fast Fourier transform (FFT) operations; and
- processing circuitry, coupled with the memory, to:
  - retrieve the plurality of CBs from the memory; and
  - process FFT operations of the plurality of CBs in parallel independently of each other.

Example X2 includes the apparatus of example X1 or some other example herein, wherein processing the plurality of CBs includes splitting bandwidth of a single component carrier into plurality of bandwidth partitions to be processed by the plurality of FFT operations, each bandwidth partition having a size smaller than an FFT size required for processing of an entire bandwidth of the component carrier in a frequency-domain.

Example X3 includes the apparatus of example X1 or some other example herein, wherein the plurality of CBs are received via a downlink (DL) transmission from a network, wherein the DL transmission is a physical downlink shared channel (PDSCH) or physical downlink control channel (PDDCH) transmission.

Example X4 includes the apparatus of example X1 or some other example herein, wherein a physical resource block group (PRG) size is aligned to boundaries of the frequency resources of an FFT operation.

Example X5 includes the apparatus of example X1 or some other example herein, wherein a number of FFT blocks is dimensioned based on a number of decoder blocks available to run in parallel.

Example X6 includes the apparatus of example X1 or some other example herein, wherein a processing time to process the plurality of CBs is determined based on: a subset of supported transport block sizes (TBSs), a subset of supported numbers of CBs in a transmission time interval (TTI), a subset of the supported numbers of CBs in an OFDM symbol, a subset of the supported transmission ranks, a subset of supported transmission bandwidths, a subset of supported of data-rates, a subset of supported throughputs, or a subset of the supported number of information bits in a payload to be processed.

Example X7 includes the apparatus of example X1 or some other example herein, wherein a processing time to process the plurality of CBs is determined based on: a wireless channel condition over which information bits of the CBs are transmitted, a scheduling parameter, or a link-adaptation parameter.

Example X8 includes the apparatus of any of examples X1-X7, wherein the processing circuitry is to estimate a processing time to process the plurality of CBs and, based on the estimate, schedule resources for transmission of a hybrid automatic repeat request (HARQ) acknowledgement/negative-acknowledgement (ACK/NACK) feedback or re-transmission of data information.

Example X9 includes the apparatus of any of examples X1-X7, wherein a time for processing the plurality of CBs is based on: a transport block size (TBS), a number of CBs in a transmission time interval (TTI), or a number of CBs in an OFDM symbol.

Example X10 includes one or more computer-readable media storing instructions that, when executed by one or more processors, cause a user equipment (UE) to:

receive, via a downlink (DL) transmission from a network, a plurality of code blocks (CBs) within one orthogonal frequency division multiplexing (OFDM) symbol that are mapped into frequency resources of a plurality of fast Fourier transform (FFT) operations; and process the FFT operations of the plurality of CBs in parallel independently of each other.

Example X11 includes the one or more computer-readable media of example X10 or some other example herein, wherein the DL transmission is a physical downlink shared channel (PDSCH) or physical downlink control channel (PDDCH) transmission.

Example X12 includes the one or more computer-readable media of example X10 or some other example herein, wherein processing the plurality of CBs includes splitting bandwidth of a single component carrier into plurality of bandwidth partitions to be processed by the plurality of FFT operations, each bandwidth partition having a size smaller than an FFT size required for processing of an entire bandwidth of the component carrier in a frequency-domain.

Example X13 includes the one or more computer-readable media of example X10 or some other example herein, wherein the plurality of CBs are received via a downlink (DL) transmission from a network, wherein the DL transmission is a physical downlink shared channel (PDSCH) or physical downlink control channel (PDDCH) transmission.

Example X14 includes the one or more computer-readable media of example X10 or some other example herein, wherein a physical resource block group (PRG) size is aligned to boundaries of the frequency resources of an FFT operation.

Example X15 includes the one or more computer-readable media of example X10 or some other example herein, wherein a number of FFT blocks is dimensioned based on a number of decoder blocks available to run in parallel.

Example X16 includes the one or more computer-readable media of example X10 or some other example herein, wherein a processing time to process the plurality of CBs is determined based on: a subset of supported transport block sizes (TBSs), a subset of supported numbers of CBs in a transmission time interval (TTI), a subset of the supported numbers of CBs in an OFDM symbol, a subset of the supported transmission ranks, a subset of supported transmission bandwidths, a subset of supported of data-rates, a subset of supported throughputs, or a subset of the supported number of information bits in a payload to be processed.

Example X17 includes the one or more computer-readable media of example X10 or some other example herein, wherein a processing time to process the plurality of CBs is determined based on: a wireless channel condition over which information bits of the CBs are transmitted, a scheduling parameter, or a link-adaptation parameter.

Example X18 includes the one or more computer-readable media of any of examples X10-X17 or some other example herein, wherein the media stores instructions to estimate a processing time to process the plurality of CBs and, based on the estimate, schedule resources for transmission of a hybrid automatic repeat request (HARQ) acknowledgement/negative-acknowledgement (ACK/NACK) feedback or re-transmission of data information.

Example X19 includes the one or more computer-readable media of any of examples X10-X17 or some other example herein, wherein a time for processing the plurality of CBs is based on: a transport block size (TBS), a number of CBs in a transmission time interval (TTI), or a number of CBs in an OFDM symbol.

Example X20 includes one or more computer-readable media storing instructions that, when executed by one or more processors, cause a user equipment (UE) to:

determine capability information associated with the UE, wherein the capability information includes one or more of: a number or type of decoder-blocks available to decode a plurality of CBs at the same time, a number of available FFT engines and their maximum sizes, a number of available RF chains or components, a number of available analog or digital pass-band filters, a number of available ADC units, and any required gaps within resources to enable parallel processing; and encode a message for transmission to a next-generation NodeB (gNB) that includes the capability information.

Example X21 includes the one or more computer-readable media of example X20 or some other example herein, wherein determining the capability information is based on an overall capability across a plurality of supported component carriers.

Example X22 includes the one or more computer-readable media of example X20 or some other example herein, wherein the media further stores instructions to receive, from the gNB, resource scheduling information based on the capability information.

Example X23 includes the one or more computer-readable media of example X20 or some other example herein, wherein the scheduling information is to optimize processing latency, performance, or resource efficiency.

Example X24 includes the one or more computer-readable media of example X20 or some other example herein, wherein the scheduling information is based on historical measurements associated with processing latency (which can performance, or resource efficiency.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |

-continued

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |

| Abbreviations<br>Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
|---|---|
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |

| Abbreviations<br>Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
|---|---|
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |

-continued

Abbreviations
Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte(1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |

-continued

Abbreviations
Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |

-continued

Abbreviations
Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |

-continued

Abbreviations
Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |

-continued

| Abbreviations Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
|---|---|
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |

-continued

| Abbreviations Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
|---|---|
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
- memory to store a plurality of code blocks (CBs) within one orthogonal frequency division multiplexing (OFDM) symbol that are mapped into frequency resources of a plurality of fast Fourier transform (FFT) operations; and
- processing circuitry, coupled with the memory, to:
  - retrieve the plurality of CBs from the memory; and
  - process FFT operations of the plurality of CBs in parallel independently of each other, wherein the plurality of FFT operations are performed by separate FFT processing blocks utilizing disaggregated input memory to independently compute output samples for different segments of the OFDM symbol bandwidth.

2. The apparatus of claim 1, wherein processing the plurality of CBs includes splitting bandwidth of a single component carrier into plurality of bandwidth partitions to be processed by the plurality of FFT operations, each bandwidth partition having a size smaller than an FFT size required for processing of an entire bandwidth of the component carrier in a frequency-domain.

3. The apparatus of claim 1, wherein the plurality of CBs are received via a downlink (DL) transmission from a network, wherein the DL transmission is a physical downlink shared channel (PDSCH) or physical downlink control channel (PDDCH) transmission.

4. The apparatus of claim 1, wherein a physical resource block group (PRG) size is aligned to boundaries of the frequency resources of an FFT operation.

5. The apparatus of claim 1, wherein a number of FFT blocks is dimensioned based on a number of decoder blocks available to run in parallel.

6. The apparatus of claim 1, wherein a processing time to process the plurality of CBs is determined based on: a subset of supported transport block sizes (TBSs), a subset of supported numbers of CBs in a transmission time interval (TTI), a subset of the supported numbers of CBs in an OFDM symbol, a subset of the supported transmission ranks, a subset of supported transmission bandwidths, a subset of supported of data-rates, a subset of supported throughputs, a subset of the supported number of information bits in a payload to be processed, a wireless channel condition over which information bits of the CBs are transmitted, a scheduling parameter, or a link-adaptation parameter.

7. The apparatus of claim 1, wherein the processing circuitry is to estimate a processing time to process the plurality of CBs and, based on the estimate, schedule resources for transmission of a hybrid automatic repeat request (HARQ) acknowledgement/negative-acknowledgement (ACK/NACK) feedback or re-transmission of data information.

8. The apparatus of claim 1, wherein a time for processing the plurality of CBs is based on: a transport block size (TBS), a number of CBs in a transmission time interval (TTI), or a number of CBs in an OFDM symbol.

9. One or more non-transitory computer-readable media storing instructions that, when executed by one or more processors, cause a user equipment (UE) to:
- receive, via a downlink (DL) transmission from a network, a plurality of code blocks (CBs) within one orthogonal frequency division multiplexing (OFDM) symbol that are mapped into frequency resources of a plurality of fast Fourier transform (FFT) operations; and
- process the FFT operations of the plurality of CBs in parallel independently of each other, wherein the plurality of FFT operations are performed by separate FFT processing blocks utilizing disaggregated input memory to independently compute output samples for different segments of the OFDM symbol bandwidth.

10. The one or more non-transitory computer-readable media of claim 9, wherein the DL transmission is a physical downlink shared channel (PDSCH) or physical downlink control channel (PDDCH) transmission.

11. The one or more non-transitory computer-readable media of claim 9, wherein processing the plurality of CBs includes splitting bandwidth of a single component carrier into plurality of bandwidth partitions to be processed by the plurality of FFT operations, each bandwidth partition having a size smaller than an FFT size required for processing of an entire bandwidth of the component carrier in a frequency-domain.

12. The one or more non-transitory computer-readable media of claim 9, wherein a physical resource block group (PRG) size is aligned to boundaries of the frequency resources of an FFT operation.

13. The one or more non-transitory computer-readable media of claim 9, wherein a number of FFT blocks is dimensioned based on a number of decoder blocks available to run in parallel.

14. The one or more non-transitory computer-readable media of claim 9, wherein a processing time to process the plurality of CBs is determined based on: a subset of supported transport block sizes (TBSs), a subset of supported numbers of CBs in a transmission time interval (TTI), a subset of the supported numbers of CBs in an OFDM symbol, a subset of the supported transmission ranks, a subset of supported transmission bandwidths, a subset of supported of data-rates, a subset of supported throughputs, a subset of the supported number of information bits in a payload to be processed, a wireless channel condition over which information bits of the CBs are transmitted, a scheduling parameter, or a link-adaptation parameter.

15. The one or more non-transitory computer-readable media of claim 9, wherein the media stores instructions to estimate a processing time to process the plurality of CBs and, based on the estimate, schedule resources for transmission of a hybrid automatic repeat request (HARQ) acknowledgement/negative-acknowledgement (ACK/NACK) feedback or re-transmission of data information.

16. The one or more non-transitory computer-readable media of claim 9, wherein a time for processing the plurality of CBs is based on: a transport block size (TBS), a number of CBs in a transmission time interval (TTI), or a number of CBs in an OFDM symbol.

17. One or more non-transitory computer-readable media storing instructions that, when executed by one or more processors, cause a user equipment (UE) to:

determine capability information associated with the UE, wherein the capability information includes one or more of: a number or type of decoder-blocks available to decode a plurality of CBs at the same time, a number of available FFT engines and their maximum sizes, a number of available RF chains or components, a number of available analog or digital pass-band filters, a number of available ADC units, and any required gaps within resources to enable parallel processing; and encode a message for transmission to a next-generation NodeB (gNB) that includes the capability information, wherein the number of available FFT engines is associated with a plurality of separate FFT processing blocks utilizing disaggregated input memory to independently compute output samples for different segments of an OFDM symbol bandwidth.

18. The one or more non-transitory computer-readable media of claim 17, wherein determining the capability information is based on an overall capability across a plurality of supported component carriers.

19. The one or more non-transitory computer-readable media of claim 17, wherein the media further stores instructions that, when executed, cause the UE to receive, from the gNB, resource scheduling information based on the capability information.

20. The one or more non-transitory computer-readable media of claim 17, wherein the scheduling information is to optimize processing latency, performance, or resource efficiency; or wherein the scheduling information is based on historical measurements associated with processing latency, performance, or resource efficiency.

* * * * *